US008795605B2

(12) United States Patent
Senftleber

(10) Patent No.: US 8,795,605 B2
(45) Date of Patent: Aug. 5, 2014

(54) APPARATUS AND METHODS FOR TRANSFERRING MATERIALS BETWEEN LOCATIONS POSSESSING DIFFERENT CROSS-SECTIONAL AREAS WITH MINIMAL BAND SPREADING AND DISPERSION DUE TO UNEQUAL PATH-LENGTHS

(76) Inventor: Fred C. Senftleber, Jacksonville, FL (US)

( * ) Notice: Subject to any disclaimer, the term of this patent is extended or adjusted under 35 U.S.C. 154(b) by 70 days.

(21) Appl. No.: 13/349,341

(22) Filed: Jan. 12, 2012

(65) Prior Publication Data

US 2013/0183211 A1 Jul. 18, 2013

(51) Int. Cl.
*B01L 3/00* (2006.01)
*G01N 21/85* (2006.01)
*B03B 7/00* (2006.01)
*G01N 27/00* (2006.01)

(52) U.S. Cl.
USPC .......... 422/504; 422/417; 209/12.1; 209/155; 204/601

(58) Field of Classification Search
USPC ....................................... 422/504
See application file for complete search history.

(56) References Cited

U.S. PATENT DOCUMENTS

| 5,842,787 | A | 12/1998 | Kopf-Sill et al. |
| 6,270,641 | B1 | 8/2001 | Griffiths et al. |
| 7,005,301 | B2 | 2/2006 | Cummings et al. |
| 2007/0253868 | A1* | 11/2007 | Beebe et al. .................. 422/100 |
| 2010/0260642 | A1* | 10/2010 | Malmqvist et al. ............. 422/57 |
| 2011/0098597 | A1* | 4/2011 | Wu et al. ....................... 600/573 |

OTHER PUBLICATIONS

J.C. Giddings, M.R. Schure, M.N. Myers, and G.R.Velez, Anal. Chem., 56, 2099-2104 (1984).
P.S. Williams, S.B. Giddings, and J.C. Giddings, Anal. Chem., 58, 2397-2403 (1986).
C.T. Culbertson, S.C. Jacobson, and J.M. Ramsey, Anal. Chem., 70, 3781-3789 (1998).
B.M. Paegel, L.D. Hutt, P.C. Simpson, and R.A. Mathies, Anal. Chem., 72, 3030-3037 (2000).
A.J. Skulan, L.M. Barrett, A.K. Singh, E.B. Cummings, and G.J. Fiechtner, Anal. Chem., 77, 6790-6797 (2005).
H.J. Sant, J.W. Kim, and B.K. Gale, Anal. Chem., 78, 7978-7985 (2006).

* cited by examiner

*Primary Examiner* — Jill Warden
*Assistant Examiner* — Brittany Fisher

(57) ABSTRACT

Non-limiting exemplary embodiment(s) of apparatus(es) and method(s) are described for the conveyance of fluid media and entrained materials between two or more locations, each possessing a different cross-sectional area. Equidistant pathways incorporated into uniquely designed conduits enable this transference to occur with minimal band spreading and separation resolution loss due to undesirable flow patterns that arise from end effects. The design enables the conduits to be employed with locations of almost any description including process channels, surfaces, or even open volume of any size and used for almost any purpose. The conduits and/or associated locations may be empty of any contents or filled with gelatinous, porous, granular, or particulated material. The design of non-limiting exemplary embodiment(s) of apparatus(es) and method(s) may be easily adapted or configured as necessary.

2 Claims, 24 Drawing Sheets

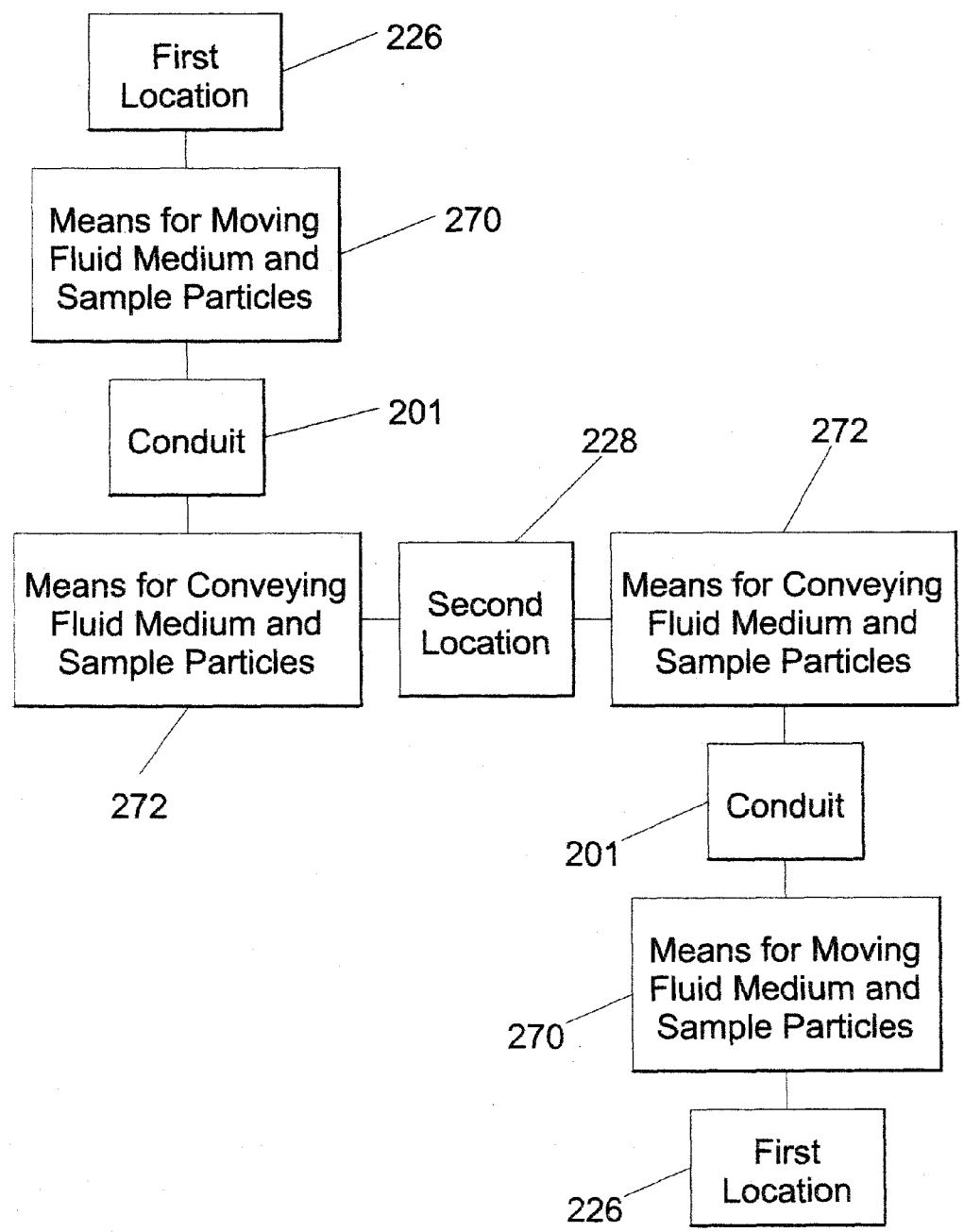

Fig. 6

| Radius to Chord Ratio r/c | Apex Angle α | Length of Sagitta h | Length of Arc s | Height of Triangle Area x | Side of Triangle Area y | Total Conduit Volume |
|---|---|---|---|---|---|---|
| 3 | 19.10 | 0.042 | 1.005 | 2.986 | 3.028 | 1.528 |
| 2.9 | 19.76 | 0.043 | 1.005 | 2.885 | 2.929 | 1.479 |
| 2.8 | 20.46 | 0.045 | 1.005 | 2.785 | 2.830 | 1.430 |
| 2.7 | 21.22 | 0.047 | 1.006 | 2.684 | 2.731 | 1.381 |
| 2.6 | 22.04 | 0.049 | 1.006 | 2.584 | 2.633 | 1.333 |
| 2.5 | 22.92 | 0.051 | 1.007 | 2.483 | 2.534 | 1.284 |
| 2.4 | 23.87 | 0.053 | 1.007 | 2.383 | 2.435 | 1.235 |
| 2.3 | 24.91 | 0.055 | 1.008 | 2.282 | 2.337 | 1.187 |
| 2.2 | 26.05 | 0.058 | 1.009 | 2.181 | 2.238 | 1.139 |
| 2.1 | 27.29 | 0.060 | 1.010 | 2.080 | 2.140 | 1.090 |
| 2 | 28.65 | 0.064 | 1.011 | 1.979 | 2.043 | 1.043 |
| 1.9 | 30.16 | 0.067 | 1.012 | 1.878 | 1.945 | 0.995 |
| 1.8 | 31.84 | 0.071 | 1.013 | 1.777 | 1.847 | 0.948 |
| 1.7 | 33.71 | 0.075 | 1.015 | 1.675 | 1.750 | 0.900 |
| 1.6 | 35.82 | 0.080 | 1.017 | 1.573 | 1.654 | 0.854 |
| 1.5 | 38.21 | 0.086 | 1.020 | 1.472 | 1.557 | 0.808 |
| 1.4 | 40.95 | 0.092 | 1.023 | 1.369 | 1.462 | 0.762 |
| 1.3 | 44.10 | 0.100 | 1.026 | 1.267 | 1.367 | 0.718 |
| 1.2 | 47.79 | 0.109 | 1.031 | 1.164 | 1.273 | 0.674 |
| 1.1 | 52.16 | 0.120 | 1.038 | 1.061 | 1.181 | 0.632 |
| 1 | 57.41 | 0.134 | 1.047 | 0.956 | 1.090 | 0.591 |
| 0.9 | 63.86 | 0.152 | 1.060 | 0.851 | 1.002 | 0.554 |
| 0.8 | 72.00 | 0.176 | 1.080 | 0.743 | 0.919 | 0.521 |
| 0.7 | 82.68 | 0.210 | 1.114 | 0.633 | 0.843 | 0.497 |
| 0.6 | 97.67 | 0.268 | 1.182 | 0.517 | 0.785 | 0.494 |

217

218

217
212
210
217
218

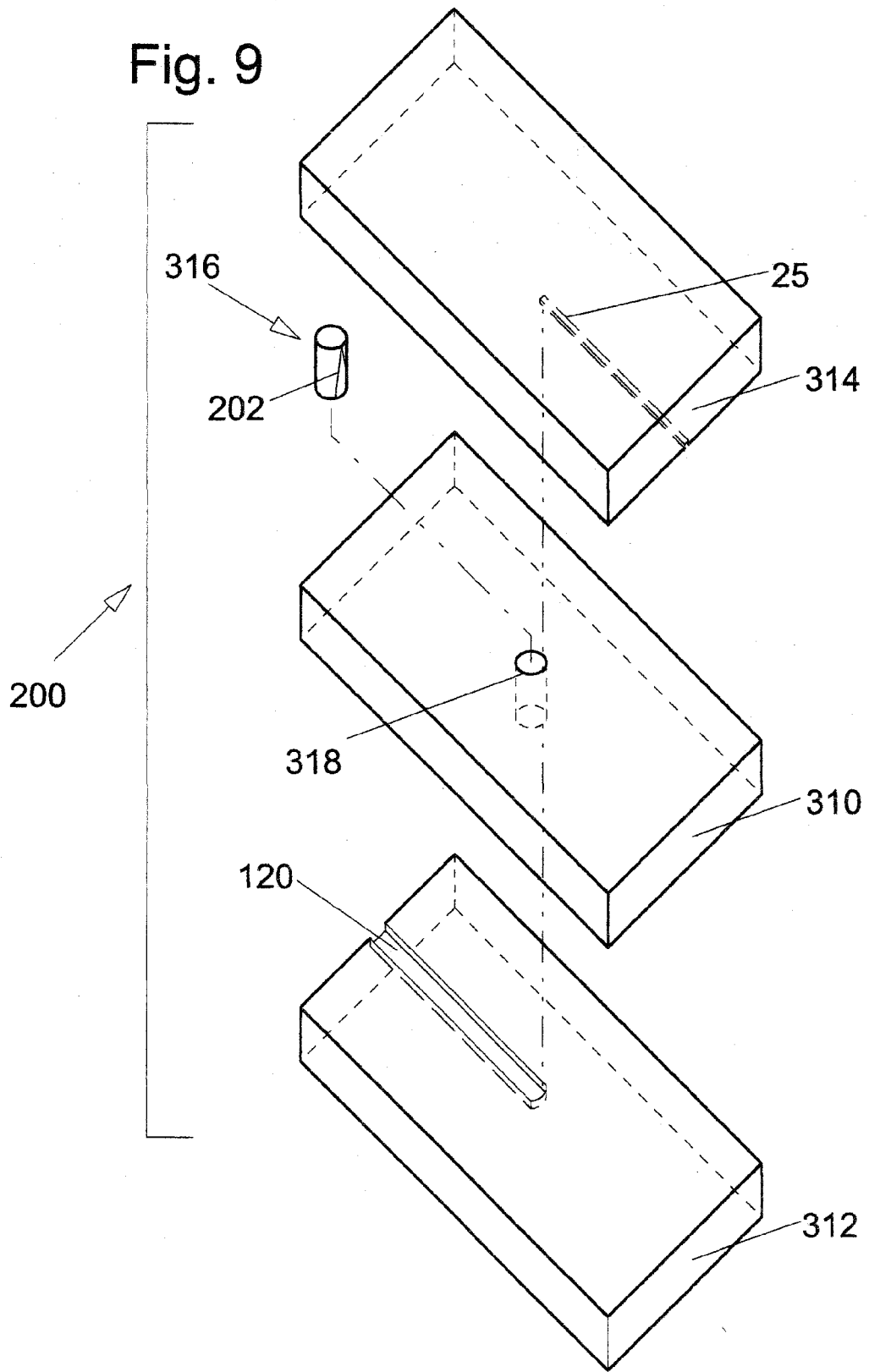

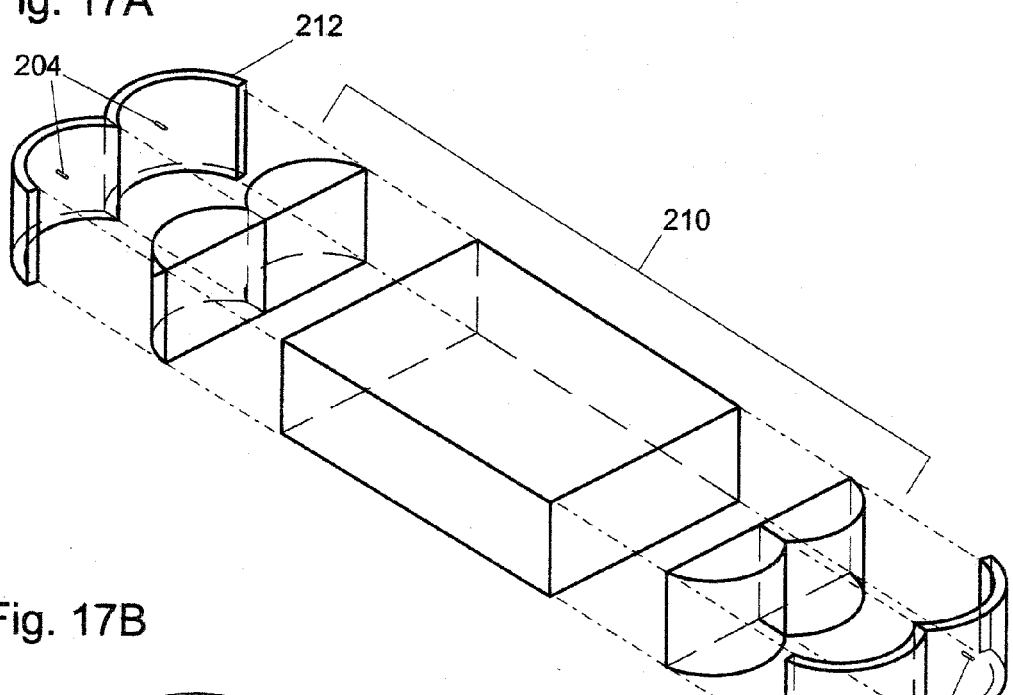
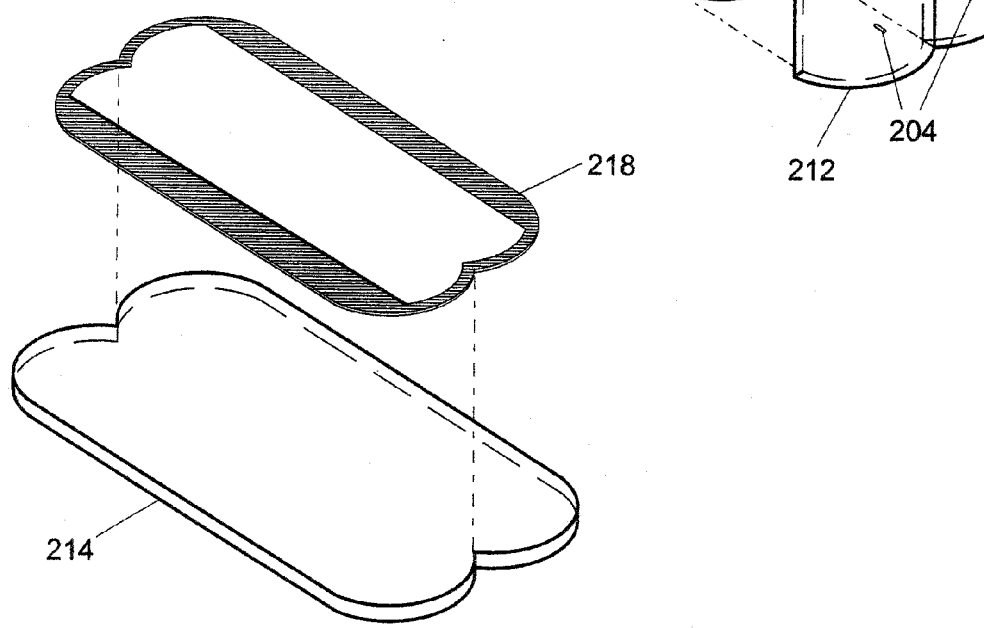

217

Fig. 19A
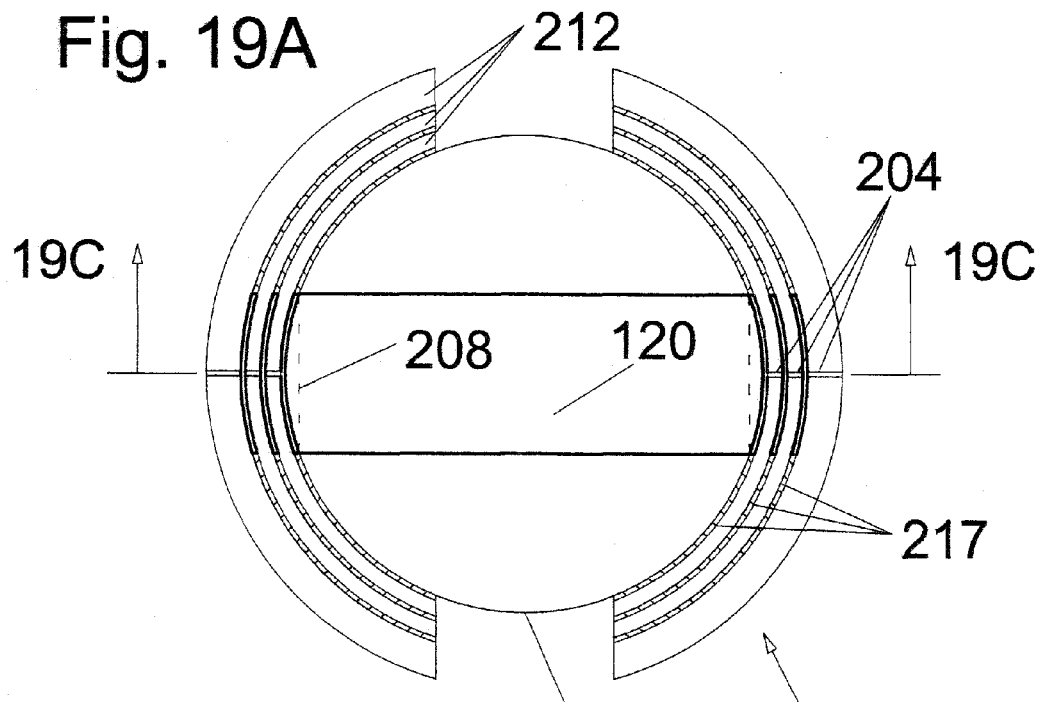
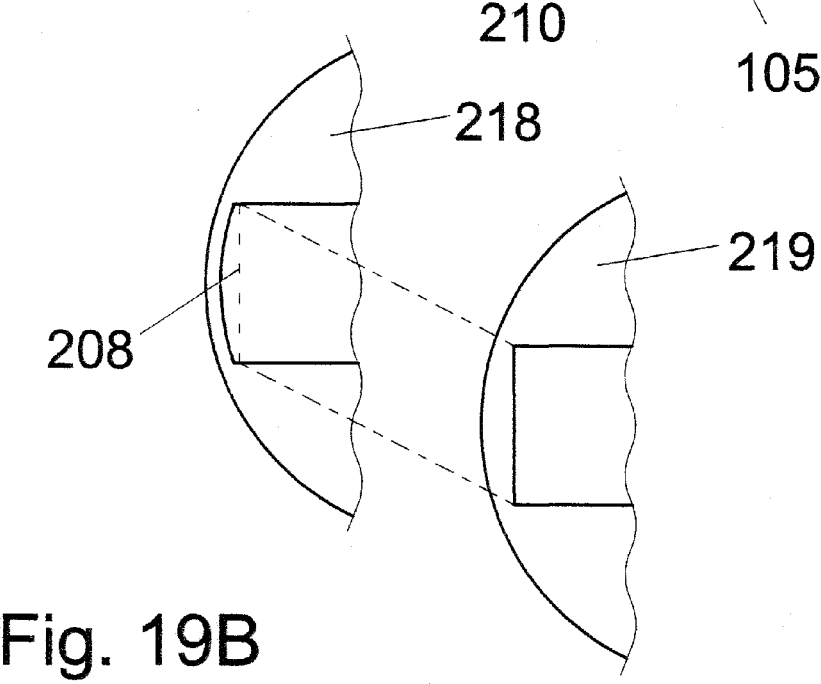
Fig. 19B

APPARATUS AND METHODS FOR TRANSFERRING MATERIALS BETWEEN LOCATIONS POSSESSING DIFFERENT CROSS-SECTIONAL AREAS WITH MINIMAL BAND SPREADING AND DISPERSION DUE TO UNEQUAL PATH-LENGTHS

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This application relates generally to fluid distribution. More specifically, the application provides apparatuses that enable fluid and sample particles to be uniformly distributed and collected to and from process channels, surfaces, or open volumes with minimal dispersion.

2. Prior Art

Many analytical and engineering processes use fluids to transport bands of material or samples between locations. In most, if not all, of these applications, it is important to keep spreading, skewing, and mixing of the bands to a minimum. As the materials move through the fluid handling systems, they can be subjected to dispersion resulting from diffusion, turbulent mixing, and non-uniform flow velocities. Unintended and undesirable hydrodynamic dispersion and stagnation can lead to material dilution, a blurring of the boundaries between adjacent bands, and unpredictable transit rates. Instead of distinct bands, there is a loss of separation resolution as materials arrive in a progressive manner over an extended period of time. In analytical and synthetic systems, it becomes difficult to reliably deliver precise concentrations of multiple reagents to specific locations at predetermined times and sequences. High throughput is most easily achieved when material or sample bands are closely spaced without significant dispersion during transport through the fluid handling system.

Such dispersion is often exacerbated when systems are miniaturized. There has been great interest in recent years in down-sizing analytical and reactor systems as the potential of micro- and nano-fluidic devices and technology to provide robust, highly accurate, high throughput, and low cost methodology has become more evident. "Lab-on-a-chip" platforms have been developed that enable sampling, separation, control, transport, mixing, incubation, reaction, and analysis, sometimes all within a single integrated device. As these systems become more complex, however, greater attention must be paid to possible sources of inadvertent band spreading.

In the late 1990s and early 2000s, a number of investigators studied turns and junctions (wyes and tees) in two-dimensional microscale systems and developed methods to minimize dispersion from these sources. Kopf-Sill and Parce (U.S. Pat. No. 5,842,787), for example, recommend using a channel turn geometry where the depth of the channel is greater that its width. The narrower width helps reduce dispersion caused by a difference in path length (and thus transit time) along the inner and outer walls of a turn, the so called "racetrack effect." Further reduction in dispersion is suggested by fabricating the turn with the depth along the inner radius greater than that of the outer to reduce flow velocity along the inner radius. Microfluidic channels with variable depths, however, are difficult to manufacture and therefore are costly. Again recognizing the advantage of narrow channels, Paegel et al. (2000) recommend a "pinched turn" design in which the channel width is reduced prior to the turn and then expanded back to the original width once the turn is complete. In a similar manner, Griffiths and Nilson (U.S. Pat. No. 6,270,641) advise that the contraction and expansion regions actually be incorporated into the turn itself. This work is extended to include 45, 90 and 180 degree turns, wyes, and tees, as well as sample splitting devices and serpentine channels for folding long columns into small areas. Not all systems, however, require a dramatic alteration to the structure. Culbertson et al. (1998) points out that under certain circumstances the skewing of material caused by a turn can often be partially reversed by simply following the first turn with a second turn in the opposite direction. The extent to which the skewing can be reversed depends on the diffusivity of the particles in the particular fluid medium and the distance between the turns.

Another concern is the dispersion that can occur as fluid passes between regions of different cross-sectional areas in the flow system. Such transitions occur, for example, at inlet and outlet ports on separation channels or reaction chambers where the orifice at the ports may be orders of magnitude smaller than the width of the channel or chamber. As fluid medium with any entrained samples emerges from the inlet tube under laminar flow conditions, it fans out to the full width of the channel. The spreading fluid produces a crescent-shaped fluid front that persists as the fluid progressively moves along the length of channel. At the other end of the channel, the fluid medium and sample particles then funnel from across the width into the outlet tubing. As a consequence, sample particles follow flow paths of varying lengths through the channel. A particle on a direct line between the inlet and outlet along the center of the channel travels a significantly shorter distance than one that first diverges from the inlet to the channel's width before converging at the outlet end. The resulting path inequities lead to a spreading of sample particles away from each other and thus band broadening. Since the transitions between the different cross-sectional areas are generally at the ends of the channel or chamber, these flow non-uniformities and the resulting dispersion are often referred to as "end effects."

Numerous suggestions have been proposed in the literature to lessen the influence of end effects on separation resolution. Most begin by incorporating a wedge-shaped (triangular) zone between the inlet or outlet port and the main body of the channel or chamber. With the port located at the apex of the triangle, the more gradual transition helps minimize the introduction of flow stagnation or turbulence into fluids moving through the transition. Using this design for example, Giddings et al. (1984) illustrated that the variation in sample path length through the channel and thus the dispersion can be reduced by simply minimizing the apex angle on the triangular transitional section. The work found reasonably good correlation between chromatographic theoretical plate height calculations and visual studies that examined the shape of the fluid flow profile using methylene blue samples in an optically transparent glass channel. In a second, more comprehensive investigation, Williams et al. (1986) mathematically corroborated the earlier work by employing conformal mapping techniques to generate theoretical equipotential curves, flow streamlines, and associated flow profiles as a function of apex angle.

Improvements in resolution, however, often come with tradeoffs and limitations. On close examination of the experimental and theoretical profiles, Williams et al. (1986) pointed out that, although reducing the apex angle decreased the end effect, it also unavoidably increased the relative contribution of the "edge effect" to the distortion of the fluid flow profile. The edge effect is a slowing of the fluid near the side walls of the channel. Photographic images of methylene blue samples in channels possessing large apex angles displayed the expected crescent-shaped flow profile compromised only by a small degree of tailing at the side walls of the channel, presumably due to edge effects. Since these tails incorporate only a very small fraction of the zonal material, their influence on the final flow profile is small. In channels with smaller apex angles, however, images showed significant tailing and departure from simple end effect calculated flow profiles. Williams et al. (1986) conjectured that the divergence could be attributed to the fact that the zonal material was in greater contact with the side walls for a longer distance. Edge effects generally become more prominent as the thickness of the channel increases. The ability to improve separation resolution by simply altering the apex angle therefore appears to be limited by the need to balance the deleterious consequences of the two (end and edge) effects. These studies by Giddings and Williams clearly show that reducing the apex angle in the transitional triangular section between regions of different cross-sectional areas is not by itself sufficient to eliminate the dispersion and resolution losses brought about by end effects.

Another method suggested for reducing end effects-associated band broadening was to reduce the volume of the transitional triangular section. From one perspective, the triangular sections can be thought of as being external to the main channel or chamber. Chromatographic theory has shown that the dispersion introduced by an external volume is proportional to the square of the volume. Two different approaches have been used to reduce the volume of the transitional section. The first was proposed by Giddings et al. (1984) and involved adjusting the thickness of the triangular section to about one-fourth that of a reference channel. This volume reduction work, which was done in conjunction with their apex angles studies, was performed using what might be considered a macroscale system. The channel had a width of 6 centimeters. Using a somewhat different approach, Sant et al. (2006) designed a flow system that incorporated an array of microstructural columns into the transitional sections. The logic here was that the columns would not only decrease the effective volume of the triangular sections, but would also redistribute the flow streams in a way that minimized differences in flow path lengths. To optimize results, the study examined a variety of microstructure geometries and configurations. Both experimental work and simulations were performed. This investigation, however, was done at a more microscale level using a channel with a width of only 3.5 millimeters. Interestingly, despite the size differential, both approaches resulted in decreased dispersion due to end effects and produced about a 50% reduction in the theoretical plate height when compared to their respective reference channels.

As indicated above, improvements in resolution, however, often come with tradeoffs and limitations. Sant et al. (2006) pointed out that further reduction in band broadening may ultimately be limited by increases in local edge effects that result from the presence of the microstructures. Consideration must also be given to the dramatically increased surface area provided by the columns and the increased possibility of intermolecular interaction with sample particles. Both approaches increase the complexity of the flow system and add another challenge to the manufacturing process. No commercially available flow system or instrument has incorporated either of the volume-reduction approaches.

Although the investigations by Giddings, Williams, and Sant were all conducted on channels employed in field-flow fractionation (FFF) separations, much of their work is adaptable to other techniques (both macro and micro) and helps illustrate the difficulties associated with designing devices to circumvent dispersion introduced by changes in cross-sectional area. Field-flow fractionation is a single-phase elution-based particle separation and characterization technique generally performed in a narrow, flat, rectangularly-shaped, ribbon-like, separation channel typically formed from two closely spaced parallel or concentric surfaces with inlet and outlet ports located at either end. The relatively simple configuration of the FFF channel and the extensive theoretical development of the FFF separation process readily facilitate the transfer of design considerations from FFF to other flow systems.

In 2006, Cummings and Fiechtner (U.S. Pat. No. 7,005,301) recommended an entirely different approach to dispersion reduction employing electrokinetic flow in microfluidic systems. Rather than directly addressing the inequality of flow path lengths associated with the racetrack and end effects as discussed above, their technique alters the direction of fluid flow by passing the flow across an abrupt interface between two regions possessing different specific permeabilities. Specific permeability is a quantity the authors define with dimensions of length, instead of the more commonly applied property of permeability, which has units of area. The system is constructed from a series of straight, open channels called "faceted flow prisms," each possessing a predetermined specific permeability established by the depth and width of the channel. The ends of a channel are cut at predetermined angles. In connecting two channels together, the actual angle used on each channel is determined by the dimensions of the channel and the directional change to be brought about in the flow. By controlling the angle, interfacial contact area, and specific permeabilities of two connecting channels, the authors indicate that a wide range of turning angles and expansion ratios are possible with minimal dispersion. The system is modular in design, allowing the component prisms to be connected in an array of different configurations including transitions between regions of different cross-sectional areas.

The methodology developed by Cummings and Fiechtner is designed specifically for microfluidic applications and assumes the presence of ideal electrokinetic flow. Unlike pressure-driven flow which produces a parabolic profile and a velocity that depends on the size of channel, the velocity profile for electrokinetic (electroosmotic) flow is flat and the velocity is independent of the channel dimensions. Electrokinetic techniques, however, also exhibit some significant drawbacks. Electroosmotic flow is not particularly robust and is highly sensitive to the physicochemical properties of the solution and channel walls. When used with real samples, care must be taken to insure that solute molecules do not adsorb onto channel walls (often unavoidable and uncontrollable) creating inhomogeneities in surface charge density and local areas of flow anomalies. The need for an electrically conductive solution with tightly controlled pH and ionic strength generally makes the technique inapplicable to non-aqueous media or the use of solution gradients. Unfortunately, the composition of the conductive solution can be influenced by the electrochemical reactions at the system's electrodes that are used to maintain the required electric field in solution. High operating voltages (1-30 kV power supply) resulting in high currents in solution can also bring about runaway Joule heating and the need for cooling.

Other concerns about the faceted prism approach are its scalability and the manufacturing precision required to achieve the desired decrease in dispersion. Because each faceted interface introduces a small amount of dispersion, there is also a practical upper limit to the number of interfaces that can be coupled together. Using electrokinetic flow alone, it is difficult to extend the methodology for microscale channels to handle macroscale systems. Studies by Skulan et al. (2005), however, have found that velocity variations along faceted interfaces using pressure-driven flow can be unacceptable for many applications. Additional dispersion can be introduced by flow velocity inequities resulting from rounded corners and inexact interfacial angles and channel depths incurred during channel fabrication.

Although novel approaches have been developed to lessen the impact of end effects on band spreading, few of the methods are currently used on a regular basis, and none totally eliminate the problem. Without a solution, however, high resolution, high throughput separations and transfer processes are difficult to achieve. The problem, in fact, is becoming even more acute as new preparative scale applications move to wider channels to provide higher load capacity and analytical work trends towards smaller microscale systems to minimize analysis time and the amount of sample and fluid medium required. Since the relative contribution of end effects to separation inefficiency dramatically increases as the channel becomes either shorter or wider, end effects ultimately limit channel dimensions. It would therefore be of substantial interest and benefit to develop apparatuses with associated methodologies that would enable the uniform distribution and collection of materials and samples to and from process channels, surfaces and open volumes without the dispersion and resolution losses introduced by the end effects associated with transitions across regions of different cross-sectional area.

The present invention is directed to overcoming one or more of the problems and solving one or more of the needs as set forth above.

BRIEF SUMMARY OF THE INVENTION

The present invention provides apparatuses and methods for the uniform transference of fluid media and any entrained materials or samples between two or more locations possessing different cross-sectional areas. What is unique is that the transference is done without the introduction of significant band spreading and dispersion. The locations may be associated with enclosed volumes, surfaces, or even open spaces. Material, for example, might be collected from narrow-bore tubing at one location and dispensed as a uniform, long, thin band across a flat surface at a second location. Alternatively, the process may be reversed. Material flowing in an open space might be uniformly sampled through a long, narrow, rectangularly-shaped input orifice and transferred to a small cross-sectional pipe or duct. In either case, the present invention enables closely spaced materials to arrive at a second location from a first with minimal dispersion or loss of resolution between the samples.

Two or more embodiments of the invention may also be placed at either end of a closed volume. Embodiments, for example, are particularly applicable to the delivery and collection of fluid media and materials to and from channels or chambers dimensioned to possess a high aspect ratio (width/thickness). Such channels may be employed to house a wide range of processes including chemical reactions, mixture separations, sample detection or characterization, and the like. The channel may be open, filled with gel, or filled with porous, granular, or particulated material. Such process channels may also be of any shape, although rectangular is common. The apparatuses and methods are designed to minimize the introduction of dispersion and separation resolution losses regardless of the size of the system, whether macro- or microscale.

Typical process channels are connected to other components in the process system with transfer lines that generally possess a much smaller cross-sectional area than the channel itself. A traditional channel in such a system might therefore be envisioned as being fabricated to include three distinct sections: a main section where the actual process occurs and two transitional sections (one incorporated at each end of the main section) that guide the movement of fluid medium and any entrained materials or samples to the main section from the channel's inlet and away from the main section to the channel's outlet. Generally, these transitional sections are triangular in shape.

End effects are flow nonuniformities and distortions that originate within the transitional sections. As material/sample particles in the fluid medium fan out from the inlet of the transitional area, generally the apex of a triangle (substantially a point), the distance traveled by individual particles will vary depending on exactly where the particle crosses along the interfacial boundary line between the transitional area and main section of the channel. Material/sample particles near the center of the interfacial line travel a shorter distance than those near the ends. These path-length inequities cause a spreading of material/sample particles away from each other (band broadening or dispersion) and thus a loss of separation resolution. The present invention replaces the transitional sections of the traditional process channel with apparatuses and methods that substantially eliminate the path-length and flow nonuniformities associated with end effects.

Each embodiment of the apparatuses for the present invention comprises a conduit of predetermined shape having two ends, one end having a small portal of predetermined size and dimensions and the other end having a large portal of predetermined size and dimensions. The shape of the interior of the conduit is designed in such a way that the length of the path through the conduit is essentially the same from the small portal on the one end of the conduit to anywhere within the dimensions of the large portal on the other end. Each embodiment is provided with a means by which fluid medium (possibly containing entrained materials and/or samples) may be either introduced into or collected from the small portal in the conduit. To function in a flow system, a means is provided to connect the large portal of the conduit to the end of the main section of a process channel. The embodiments are used in lieu of the traditional transitional sections. A simple channel assembly may be configured, for example, by connecting one embodiment at each end of a rectangularly-shaped main section. With the channel arranged in this way, fluid medium and sample particles travel into the small portal on one embodiment, through the main section of the channel, and out of the small portal in the second embodiment. Since the length of all paths through the channel from the small portal at one end to the small portal at the other is essentially the same, the channel eliminates the flow nonuniformities and distortions that generally originate within the triangular areas of the traditional process channel. The embodiment-incorporated channel provides less dispersion and greater material/sample separation resolution than a comparably dimensioned process channel of the more traditional design.

The design of the apparatuses in the present invention may take many forms. In some embodiments, the hollow space within the conduit may be a single entity with a small portal at one end to connect to inlet or outlet tubing and a large portal at the other end of the conduit dimensioned to fit the opening in the main section of channel to which it is to be attached. In other embodiments, the conduit may be subdivided into multiple entities, each originating at a common small portal. The openings at the other end of the entities collectively constitute the large portal and are configured as a unit to fit the dimensions of the main section of channel to which the conduit is to be attached. In either the single or subdivided case, the path length through the conduit from the small portal on the one end of the conduit to anywhere within the dimensions of the opening or openings that make up the large portal at the other end of the conduit are essentially the same.

The shape and configuration of the conduit in a particular embodiment depend on the process system into which it is to be incorporated and the specific application for which the system is to be used: Embodiments may be open, filled with gel, or filled with porous, granular, or particulated material. Embodiments may be fabricated as a continuous part of the main section of the channels or designed to be readily disconnected and/or disassembled for ease in cleaning or replacement. Construction materials and techniques may be selected to accommodate almost any sample and/or choice of fluid medium. Where required, embodiments may provide multiple simultaneous input and/or output connections to a single main section of the channel. The overall size and alignment of embodiments may be adjusted to the requirements of almost any process system. The present invention is particularly effective when incorporated into "lab-on-a-chip" microscale and manufacturing preparative macroscale process systems, applications where traditional process channels are most susceptible to end effect band spreading and resolution losses.

Non-channel applications of the invention include uses where sample material is collected from surfaces or open volumes. Designed with a long, narrow large portal, embodiments of the invention can uniformly sample across a conveyer of moving material collecting only a very narrow band of material. Such a capability is desirable when trying to discriminate between closely spaced longitudinally placed samples or increments along the conveyer. The apparatus might be used to sample the bands on an electrophoresis gel, for example, or the strata in a vertical collected ice or sediment core. Alternatively the invention may be used to deposit sample materials onto surfaces or into open volumes. Some applications are best performed employing two embodiments of the invention coupled to function in unison. One embodiment uniformly supplies fluid medium to a surface to dissolve, dislodge, or extract sample material while an adjacent second embodiment collects the dissolved, dislodged, or extracted material for transport to subsequent processing.

The embodiments and procedures included in the following descriptions of the present invention are given to illustrate the basic principles and versatility of the invention, and are not intended to limit the scope of the invention. Each embodiment was chosen to demonstrate a particular capability of the present invention to circumvent or dramatically reduce the end effect problems that are associated with the traditional channels typically used in most process systems.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 3 shows a generalized block representation of an overall approach to an apparatus that incorporates two embodiments of the present invention.

FIG. 6 shows typical values for the apex angle as a function of the circle radius-to-channel width ratio, r/c. FIG. 6 also shows the influence of the circle radius-to-channel width ratio on the relative magnitudes of conduit dimensions and volume.

FIG. 9 shows an exploded view of one embodiment of a conduit designed to facilitate construction using micro fabrication techniques. The conduit in FIG. 9 comprises three rectangular solid substrates (A, B and C) and one cylindrically shaped substrate (D).

FIG. 17A shows an exploded view of components used to construct the upper portion of multiple side-by-side conduits.

FIG. 17B shows an exploded view of components used to construct the lower portion of multiple side-by-side conduits.

FIG. 19A shows a channel assembly from a perspective perpendicular to fluid medium flow through the channel that provides a view across the width of the channel.

FIG. 19B shows examples of second and third spacers used in the construction of the channel assembly in FIGS. 19A and 19C.

DETAILED DESCRIPTION OF THE INVENTION

Figure 1A:
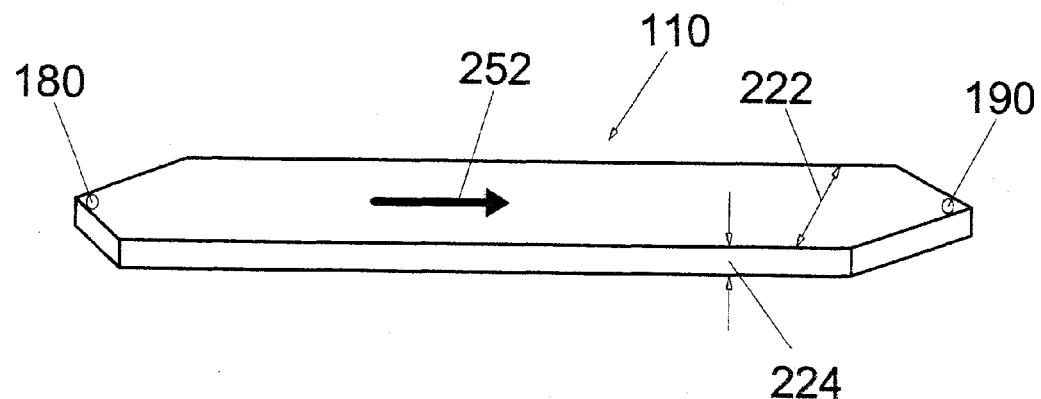
FIG. 1A shows a simplified isometric representation of a traditional high aspect ratio (width/thickness) channel as may be found in prior art.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "present invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The below disclosed subject matter is to be considered illustrative, and not restrictive, and the appended claims are intended to cover all such modifications, enhancements, and other embodiments which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

For clarity in presenting and understanding the present invention, the following definitions are provided. Unless defined otherwise, all technical and scientific terms used herein have the same meaning as is commonly understood by one of ordinary skill in the art to which this invention belongs. All patents, applications, and scientific publications cited in any section of this application are incorporated herein in their entirety. If a definition set forth in this section is contrary to or otherwise inconsistent with a definition set forth elsewhere in the patent or scientific literature incorporated by reference herein, the definition set forth in this section prevails.

The term "conduit" as used herein shall refer to an enclosed space or passageway that facilitates the movement of fluid medium and any entrained sample material from one location to another location. The conduit includes at least one small portal at one end and at least one large portal at the other end. The small and/or large portal may be designated as an inlet or outlet port. The shape of the conduit is such that the length of the path through the conduit from the small portal to anywhere within the large portal is substantially the same. The small and large portals may be subdivided into smaller subsections. The conduit may be totally empty and open or filled (entirely or partially) with materials or objects that may alter the flow of fluid medium and/or sample materials through the channel. The objects, for example, may be an array of posts or columns randomly or systematically arranged within the conduit. Alternatively, the conduit may be filled or packed with porous or non-porous media such as beads or micro- or nanoparticulate materials, or frits, or porous sol-gels, or fibers or yarns, or the like, or any combination thereof. To use the conduit for its intended purpose, a means is provided for moving fluid medium and sample particles to or from the small portal in the conduit. A means is also provided for conveying fluid medium and sample particles from or to the large portal in the conduit to or from a channel, a device, a surface, or other designated area or volume.

The term "conduit assembly" as used herein shall refer to the physical structure that encloses and defines the size and shape of the conduit.

The term "channel" or "process channel" as used herein shall refer to an enclosed space or volume having a thickness, a width, and a length of predetermined dimensions. The channel possesses at least one opening located towards one end for passing fluid medium into the channel and at least one opening located towards the other end for passing fluid medium out of the channel. The openings may be designated as the inlet and outlet ports, respectively. To differentiate embodiments of the present invention from prior art, the term "traditional channel," "traditional process channel," or "traditionally constructed channel" as used herein shall refer to channels that typically can be envisioned to include three distinct sections: a main rectangular section where the actual process occurs and two transitional sections (one incorporated at each end of the main section) to facilitate the movement of fluid medium and sample material between the channel's inlet and outlet ports and the main section. The "traditional" terms also apply to channels that include only one transitional section and/or channels where the process in the channel occurs in both the main and transitional sections. The term "path-equalized channel," or "path-equalized process channel," as used herein shall refer to channels where the transitional section in the traditional channel is replaced with a conduit as defined above. Also as discussed above with the conduit, the channel (either traditional or path-equalized) may be totally empty and open or filled (entirely or partially) with materials or objects that may alter the flow of fluid medium and/or sample materials through the channel.

The term "channel assembly" or "process channel assembly" as used herein shall refer to the physical structure that encloses and defines the space or volume occupied by the channel or process channel.

The term "fluid medium" as used herein shall include any gas, liquid, supercritical fluid, or mixture thereof that may be used to dissolve, disperse, or suspend the sample materials. The fluid medium may be a pure substance or a mixture, inorganic or organic, polar or non-polar, an ionic liquid, or an aqueous solution. The medium may include dissolved materials to influence or control ionic strength, pH, surface tension, or other physicochemical characteristics. The fluid medium is generally used to carry the sample materials through the channel and, where applicable, through peripheral instrumentation and equipment (such as the pump, injection device, detector, connecting tubing, and the like).

The term "sample material" or "sample particles" as used herein shall refer to materials that may be added to the fluid medium. The materials may be dissolved, dispersed, suspended, or in any other form in the fluid medium. Individual particles of the material may be rigid or deformable and range in dimension from atomic size to 100 micrometers or larger. The materials may be singular in nature or composed of aggregates or clusters, in any phase (solid, liquid, or gas) or combination thereof. The materials may be regular in shape or amorphous, naturally occurring or synthetic. Although not limited to the following examples, this definition includes such materials as organic and inorganic macromolecules, polymers, and aggregates, nanotubes and related materials, emulsions and sols, micelles, dusts and powders, DNA, RNA, proteins, viruses, bacteria, plant and animal cells, cell aggregates, cell parts, and freshwater and marine organisms. Biological materials may be living or non-living.

The term "end effects" as used herein shall refer to undesirable patterns introduced into the flow of fluid medium and sample materials or particles while passing through the transitional sections in the traditional process channel. The transitional sections are used to facilitate the movement of fluid medium and sample particles between the channel's main section and the channel's inlet and outlet ports. As fluid medium with its entrained sample particles emerges from the inlet port, it fans out to the full width of the channel. The spreading fluid produces a crescent-shaped fluid front that persists as the fluid progressively moves along the length of channel. At the other end of the channel, the fluid medium and sample particles then funnel from across the width into the outlet port. As a consequence, sample particles follow flow paths of varying length through the channel. A particle on a direct line between the inlet and outlet along the center of the channel travels a significantly shorter distance than one that first diverges from the inlet to the channel's width before converging at the outlet end. The resulting path inequities lead to a spreading of sample particles away from each other (band broadening) and a loss of separation efficiency and resolution. The term "end effects" may also be used herein to describe band broadening that results from path inequities that may occur when sample particles are introduced at any point along the length of the channel.

The present invention is designed to provide uniform transfer of fluid media and any entrained materials or samples between different locations possessing different cross-sectional areas. The transfer is made in a way that minimizes the band spreading and distortion that can originate from flow path-length inequities. Although simple in concept, particular details of the invention are most easily understood when delineated in the context of a specific application. As a means of demonstration and explanation therefore, much of the following discussion describes the invention as it specifically applies to the movement of fluids and materials to and from high aspect ratio (width/thickness) process channels (or chambers). Such channels find broad utilization in both laboratory and industrial settings for processes that range from simple chemical synthesis to the separation and characterization of complex mixtures. It should be understood, however, that this application to process channels is only being employed as an example for illustration. The concepts described are readily adaptable to a wide variety of other applications. In addition to the invention's use with totally enclosed entities, the invention may also be applied to the delivery and/or collection of fluid medium and materials to and from surfaces or even open space areas. The embodiments shown in FIGS. 7-20 illustrate this flexibility.

Figure 1B:
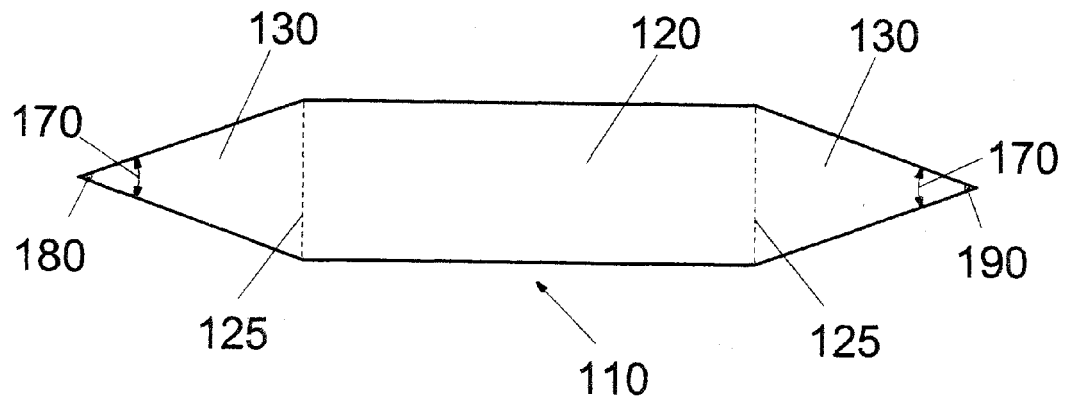
FIG. 1B shows a simplified cross-sectional representation of a traditional high aspect ratio (width/thickness) channel as may be found in prior art. The view is looking at the width of the channel through the thickness and perpendicular to the fluid medium flow.

FIGS. 1A and 1B show a traditional high aspect ratio (width 222/thickness 224) channel 110 as may be found in prior art. FIG. 1A is from a more isometric perspective while 1B focuses on the width of the channel. Such a channel 110 may typically be envisioned as possessing three regions: a main section 120 where the actual process occurs and two transitional sections 130, one incorporated at each end of the main section 110. The transitional sections 130 guide the movement of fluid medium and any entrained materials or samples to the main section 120 from the channel's inlet port 180 and away from the main section to the channel's outlet port 190. Arrow 252 shows the direction of flow through the channel 110. Generally, these transitional sections 130 are triangular in shape, each with an apex angle 170, generally of equal size. The inlet 180 and outlet ports 190 are typically located at the apices of the triangles. Line 125 indicates the position of the interfacial boundary between the main section 120 and transitional section 130.

Figure 2A:
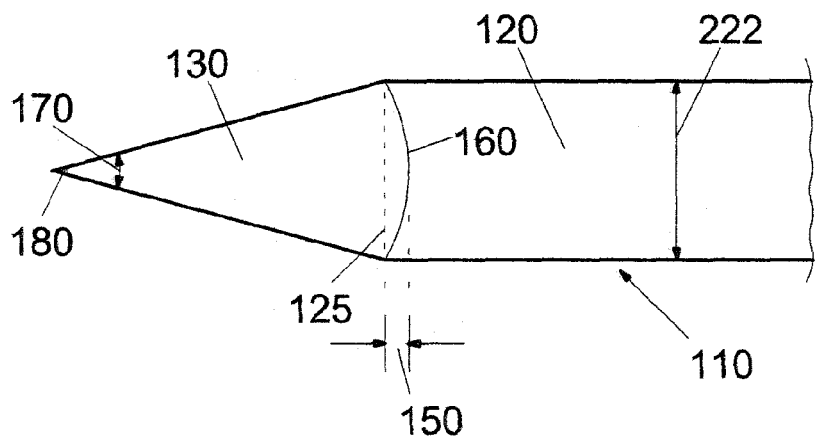
FIG. 2A shows the extent of longitudinal band spreading that can occur in a traditional high aspect ratio channel from prior art. The apex angle is equal to 30 degrees.
Figure 2B:
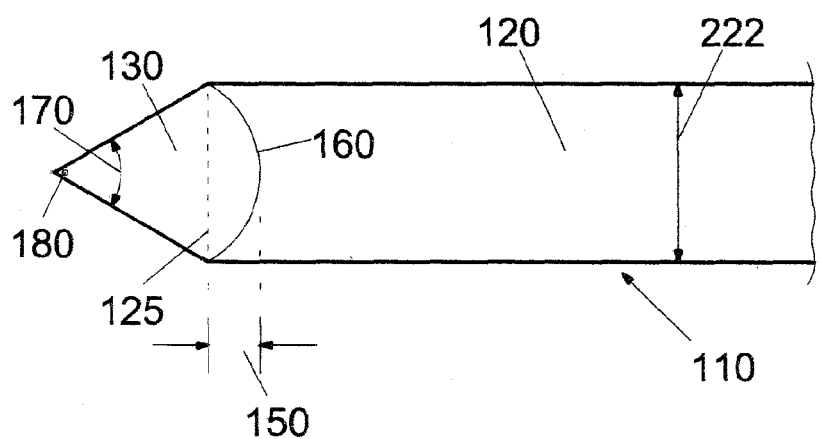
FIG. 2B shows the extent of longitudinal band spreading that can occur in a traditional high aspect ratio channel from prior art. The apex angle is equal to 60 degrees.
Figure 2C:
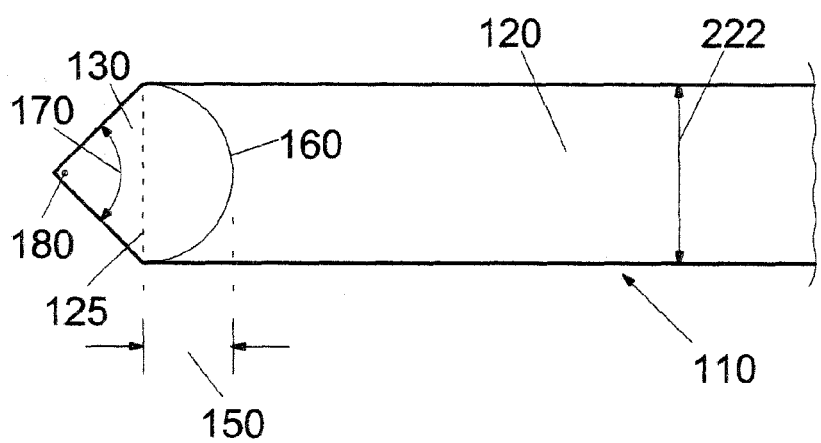
FIG. 2C shows the extent of longitudinal band spreading that can occur in a traditional high aspect ratio channel from prior art. The apex angle is equal to 90 degrees.

As fluid medium enters the channel 110 through inlet port 180, the fluid follows the shape of the transitional section 130 as it fans out to the full width 222 of the main section 120 of the channel 110. The result, as shown in FIGS. 2A-2C, is the formation of a curved arch-shaped fluid front 160 that is subsequently maintained as the fluid medium continues into the main section 120. When a collection of sample particles is introduced into the inlet port 180 as a tight plug, the sample particles fan out in a similar arch-shaped fashion. With the vector of particle motion split between the longitudinal and lateral directions, the forward migration of the individual particles through channel 110 is not all the same. There is a longitudinal spreading 150 of the collection of particles down the channel. The forward (longitudinal) distance traveled by individual particles varies depending on exactly where the particle crosses along the interfacial boundary line 125 between the transitional section 130 and main section 120 of the channel. Particles near the center of the interfacial line 125 travel a shorter distance between the inlet port 180 and the interface 125 than those near the ends. The extent of distance disparity depends on the size of the apex angle 170. As the size of the angle increases, the longitudinal spreading 150 also increases. The apex angles 170 in FIGS. 2A, 2B, and 2C are 30, 60, and 90 degrees, respectively. These path-length inequities, often called end effects, cause a spreading (band broadening or dispersion) of material/sample particles away from each other and thus a loss of separation resolution.

In general then, the problem to be corrected requires that fluid medium and materials be transferred from a first location to a second location or vice versa without incurring end effects. FIG. 3 shows a generalized block representation of an overall approach to an apparatus that can provide this transfer ability. The transfer is made through a conduit 201. The conduit 201 has a predetermined shape and includes a small portal 204 (shown in FIG. 4) of predetermined size and dimensions and a large portal 206 (also shown in FIG. 4) of predetermined size and dimensions. The shape of the conduit 201 is such that the length of the path through the conduit 201 from the small portal 204 to anywhere within the large portal 206 is substantially the same. A means 270 is provided for moving fluid medium and sample particles into or out of the small portal 204 in the conduit 201 from or to a first location 226. A means 272 is also provided for conveying fluid medium and sample particles from or to the large portal 206 in the conduit 201 to or from a second location 228.

Figure 4A:
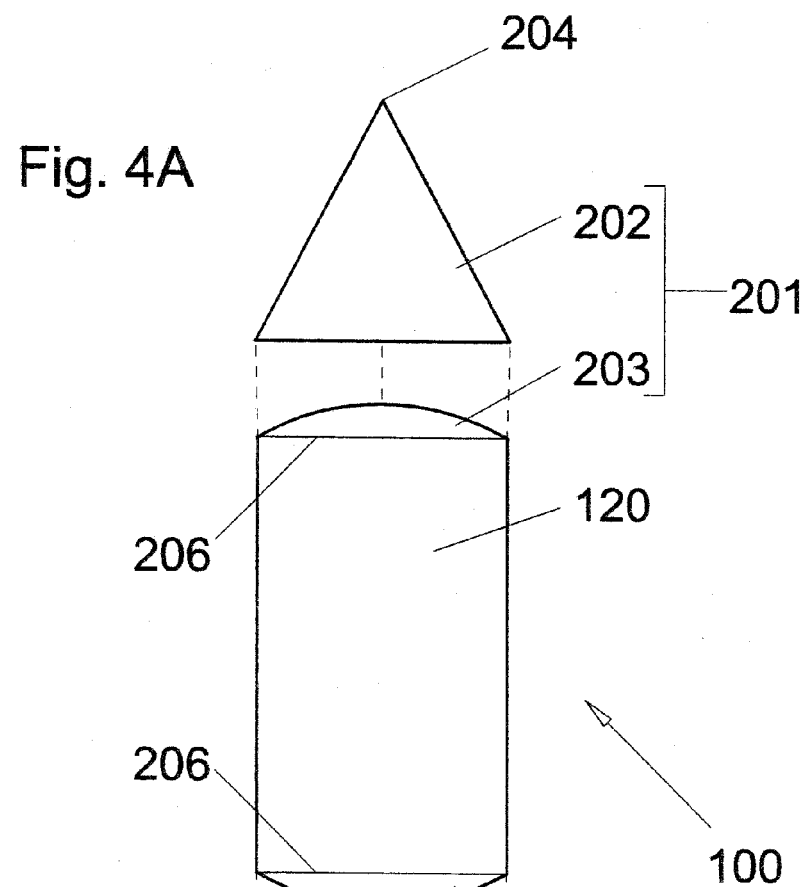
FIG. 4A shows an exploded view of one embodiment of a conduit connected to both end of the main section of a process channel.
Figure 4B:
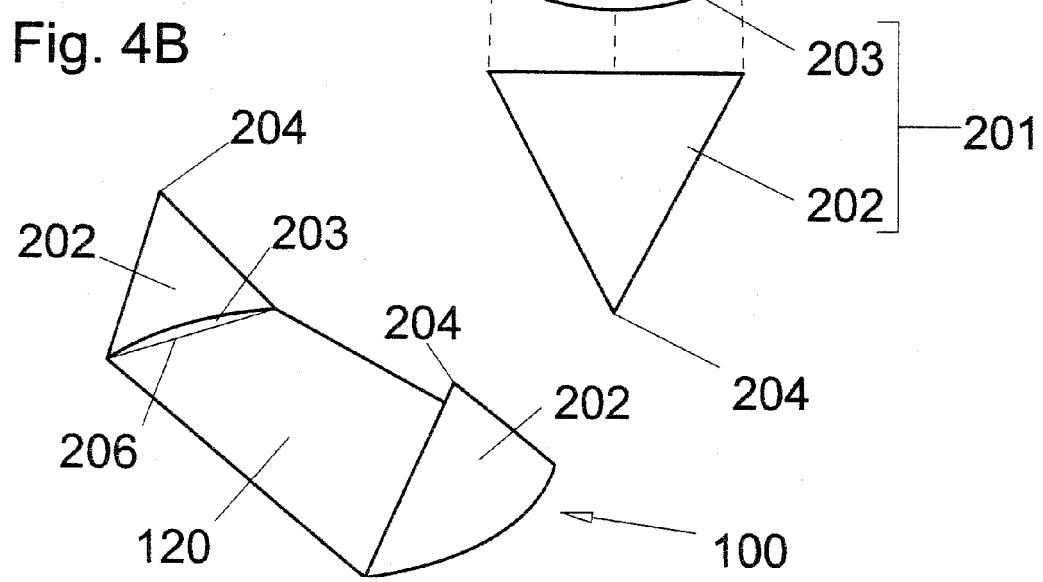
FIG. 4B shows the same process channel as in FIG. 4A, except in FIG. 4B the components are assembled together and shown from a more isometric perspective.

FIGS. 4A and 4B show the overall approach in FIG. 3 applied to a process channel. To circumvent the end effects problem, the transitional section 130 of the traditional process channel 110 (FIG. 1B) is replaced with a conduit 201 (the present invention) configured to provide uniform distances from end- to-end regardless of the path through the conduit. The modified channel is referred to as a path-equalized channel 100 and incorporates two conduits 201, one connected to either end of the main section 120 of a channel. Each conduit 201 comprises a small portal 204 of predetermined size and dimensions and a large portal 206 of predetermined size and dimensions. The shape of the conduit 201 is such that the length of the path through the conduit 201 from the small portal 204 to anywhere within the large portal 206 is substantially the same. The connection between the large portal 206 in the conduit 201 and the main section of the channel 120 provides the means 272 (FIG. 3) for conveying fluid medium and sample particles between the two. The main section of the channel 120 serves as the second location identified in FIG. 3. Inlet 25 and outlet 55 tubes, not shown in FIG. 4 but discussed in connection to FIG. 10, provides a means 270 (FIG. 3) for moving fluid medium and sample particles into or out of the small portal 204 in the conduit 201 from or to a first location 226 (FIG. 3).

The exploded view in FIG. 4A shows the conduit 201 in two parts. The lower part 203 of the conduit 201 has a straight edge (line 206) and a curved edge. Connection of the lower part 203 is made to the end of the main section 120 of the process channel along the straight edge. Both the main section 120 and the lower part 203 of the conduit 201 are in the same plane. The triangularly-shaped upper part 202 of the conduit 201 projects perpendicular to that plane and is connected to the lower part wrapped around its curved edge. The corners of the upper part 202, lower part 203, and main section 120 all intersect. The small portal 204 in the conduit 201 is located at the apex of the triangularly-shaped upper part 202. FIG. 4B shows the process channel 100 from a more isometric perspective with the components assembled together.

A simple mathematical model will help illustrate how the conduit 201 eliminates the end effects associated with traditional process channels. To avoid unnecessary complications in the calculations, a model is chosen that essentially treats the structure of the embodiment as a surface. This simplification is particularly appropriate to applications of the invention that involve channels or chambers of uniform thickness with a high aspect ratio (width/thickness) where the flow velocity across the thickness can often be treated as a monolithic entity represented by a single mean value. By employing this surface approximation, any analysis of flow pathways can then be restricted to only those oriented across the width of the embodiment. Further simplification is also realized by neglecting any dispersion that might be introduced as a result of diffusion or edge effects and by assuming that all flow velocities across the various pathways are uniform. Although more encompassing or sophisticated approaches can be taken, the model discussed here has been found to correlate well with experimental data and emphasizes the ease with which embodiments can be designed and constructed.

Figure 5:
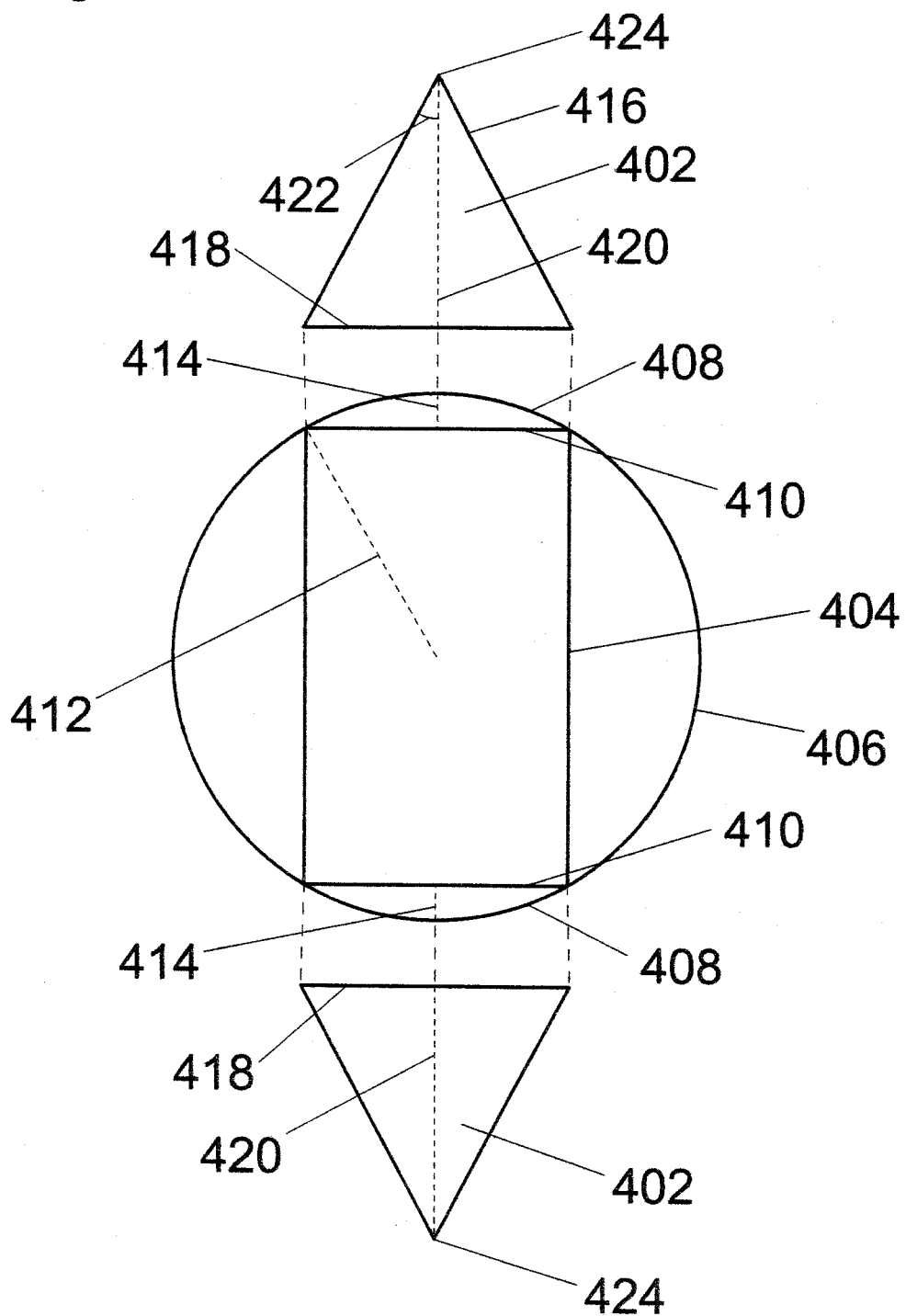
FIG. 5 shows the components of a model that can be used to explain the operating principles underlying one embodiment of the conduit.

FIG. 4A is redrawn as FIG. 5 to better emphasize the components in the model. The main section 120 of the path-equalized channel 100 in FIG. 4A is represented in FIG. 5 as a rectangle 404 placed inside a circle 406 in such a way that the corners of the rectangle coincide with the circumference of the circle. The width of the rectangle 404 defines the length of chords 410 and identifies the ends of arcs 408. Two isosceles triangular areas 402 are wrapped around the circumference of the circle at either end of the rectangle 404 with the apices 424 of the triangular areas pointing perpendicular to the plane of the circle. In the model, the bases 418 of the triangular areas 402 are made equal to each other and identical to the length of the arcs 408. The area between the chord 410 and arc 408 in FIG. 5 corresponds to lower part 203 of the conduit 201 in FIG. 4A. The triangular area 402 corresponds to upper part 202 in FIG. 4A. In a similar way, chord 410 in the model shown in FIG. 5 corresponds to the large portal 206 in FIG. 4A and the small portal 204 in FIG. 4A is located at the apex 424 in FIG. 5. In embodiments that incorporate this design, fluid would enter at the apex 424 of the triangular area 402 and flow to chord 410 which defines one end of the main section 120 of the channel 100 in FIG. 4A (represented in FIG. 5 by rectangle 404). In a similar way, fluid exiting the main section (rectangle 404) at the opposite end would flow from the second chord 410 to apex 424 of the other triangular area 402. Understand that some embodiments might only incorporate the entrance or exit portion of the design. One of the compelling features of this model is that only simple geometric relationships are required to calculate the parameters needed to construct most embodiments of the invention.

The calculations are approached here by first defining the width of the desired channel (rectangle 404) and the radius 412 of the circle 406. These parameters are then used to determine the length of the arc 408 and the dimensions of the adjoining triangular areas 402.

Based on the properties of intersecting chords, it can be shown that $$(2r - h)h = \left(\frac{c}{2}\right)^2 \qquad \text{Eq. 1}$$

where "r" is the radius 412 of the circle, "c" is the length of the chord 410, and "h" is the length of the sagitta 414, a line segment drawn perpendicular to the chord between the midpoint of the chord 410 and the arc 408 of the circle. Sagitta 414 is determined by rearranging Eq. 1 to a quadratic form, Eq. 2, and then solved with a quadratic formula to produce Eq. 3.

$$h^2 - 2rh + \frac{c^2}{4} = 0 \qquad \text{Eq. 2}$$

$$h = r - \left(r^2 - \frac{c^2}{4}\right)^{1/2} \qquad \text{Eq. 3}$$

In addition, once defined, the circle radius 412 and the length of the chord 410 can also be used to determine s, the length of arc 408, which, in turn, defines the length of the bases 418 of the triangular areas 402.

$$s = 2r\left[\arcsin\left(\frac{c}{2r}\right)\right] \qquad \text{Eq. 4}$$

The remaining dimensions of the triangular area 402 are evaluated by recognizing that dispersion due to unequal pathways will only be minimized if a uniform distance exists between apex 424 and any point on the adjacent chord 410. With this concept in mind, a convenient way to proceed is to set two such pathways equal to each other. For example, "y", the length of the side 416 of the triangular area should equal the sum of "x", the height 420 of the triangular area at its center, and "h", the sagitta 414.

$$y = x + h \qquad \text{Eq. 5}$$

Values for "x" and "y" can then be expressed trigonometrically in terms of "c", the length of the chord 410, "s", the length of the arc 408, and angle "θ", 422.

$$\frac{c}{\cos\theta} = \frac{s}{2\tan\theta} + h \qquad \text{Eq. 6}$$

Angle "θ" can then be determined by applying an iterative approach to Eq. 6, the point where the right and left hand sides of Eq. 6 become equal. The apex 424 of the triangular area 402 has an angle, "α", that is numerically twice the value of angle "θ", 422.

$$\alpha = 2\theta \qquad \text{Eq. 7}$$

FIG. 6 shows typical values for the apex angle as a function of the circle radius-to-channel width ratio, "r/c". An embodiment constructed for a channel that is 25.0 mm wide using a circle radius of 25.0 mm, a "r/c" ratio of 1.00 for example, requires an apex angle of 57.4 degrees. Ratios rather than absolute dimensions were used in constructing FIG. 6 to emphasis the universal applicability of the model to almost any size system, from analytical microscale to preparative macroscale. All values in the FIG. 6 are calculated based on assigning the chord "c" an arbitrary length of 1. In setting up the model, the length of the chord 410 (FIG. 5) is the same as the width of the main section 120 of the channel 100 (FIG. 4A).

Although geometrically any "r/c" ratio in FIG. 6 provides uniform distances between the apex of the triangular area 402 and chord 410, laboratory test results show that other factors must also be taken into consideration. Neither an excessively small nor an excessively large r/c ratio is desirable. Experimentally, as the r/c ratio becomes smaller, fluid medium flow exhibits a greater tendency to become unstable at high flow rates. Instability generally leads to mixing and greater dispersion. At the other extreme, as the size of the r/c ratios becomes larger, the overall length of the embodiment increases and the total volume of the structure expands. The volume almost doubles as the r/c ratio is increased from 1.0 to 2.0. Experimental results show that large void volumes outside the main process section of the channel generally also contribute to an overall increase in dispersion and a loss of separation resolution. This dispersion is further augmented by what are called "edge effects." The larger "r/c" ratios (small apex angles) contract the width of the structure providing greater contact between fluid medium and the structure's side walls. Fluid adjacent to the walls moves slower relative to the flow rate in the bulk of the fluid due to friction or drag. The narrower the structure, the greater the variation in flow velocities and the greater the dispersion due to edge effects. The optimal configuration generally depends on the application and the overall size of the structure. The best experimental results are typically found at intermediate "r/c" ratios of about 1.0.

Figure 7:
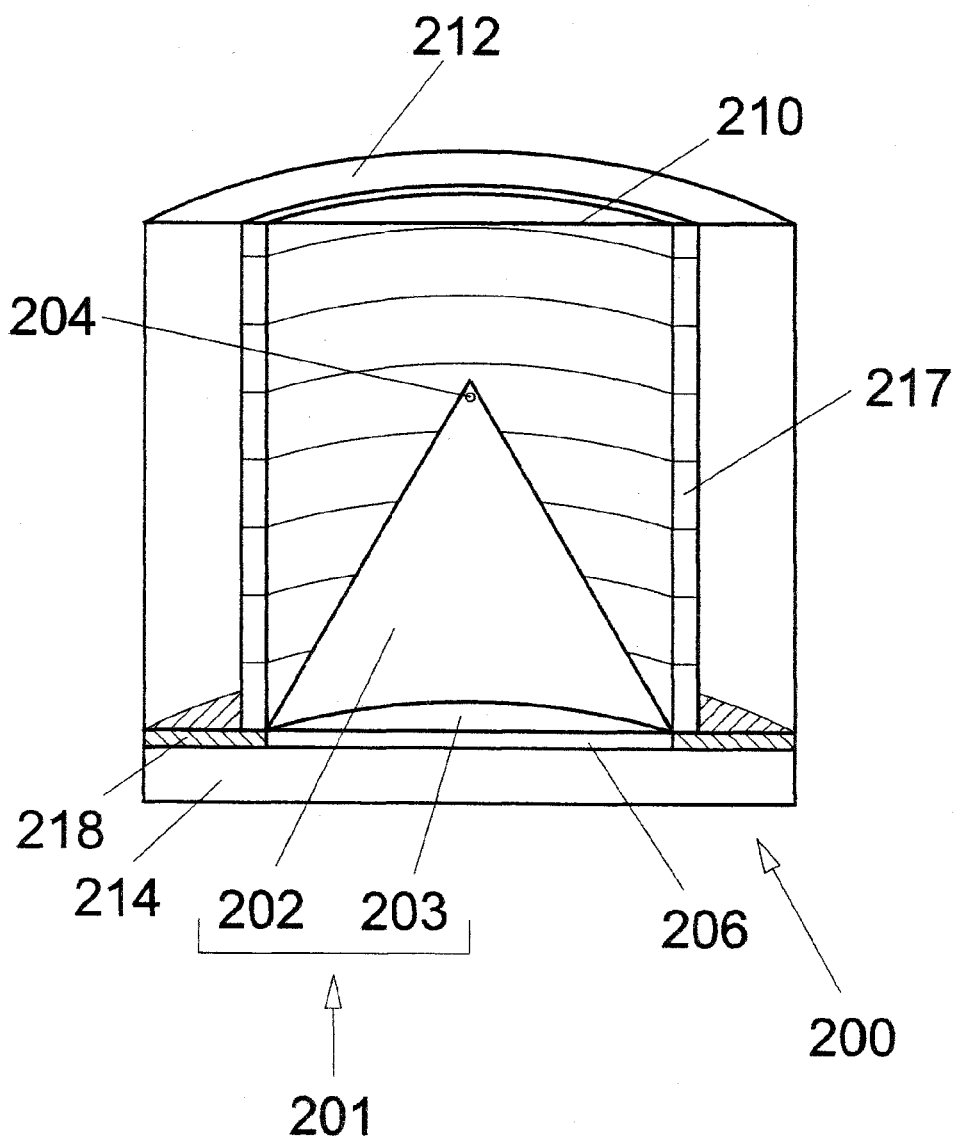
FIG. 7 shows an isometric representation of a conduit assembly according to one embodiment of the present invention.

The conduit assembly is the physical structure that gives shape to the conduit. FIG. 7 shows an isometric representation of a conduit assembly 200 according to one embodiment of the present disclosure viewed from the side that would be connected to the main section 120 of a path-equalized channel 100 (FIGS. 4A and 4B). The embodiment is easily constructed from readily available materials without the aid of computer-assisted machining devices and is typical of a conduit that might be used in a macro-size (or larger micro-size) channel assembly. Other embodiments more conducive to micro- or nano-size construction are discussed later. The conduit assembly 200 in FIG. 7 comprises three substrates: first 210, second 212, and third 214, described below. Each may be composed of a variety of solid materials including materials that are electrically and thermally conductive, semi-conductive, or nonconductive in nature, or various composites or combinations thereof. The substrates may be singular entities, layers of the above materials, or materials covered or coated with liquid or semi-liquid substances. Aluminum, copper, glass, polymer plastics, and the like are commonly employed materials. The substrates may be of the same material or different. For ease in construction and maintenance, the use of optically transparent materials is helpful.

The conduit 201 within the conduit assembly 200 is formed by fitting appropriately shaped substrates 210, 212, and 214 together separated by appropriately designed and configured spacers 217 and 218. The first substrate 210 is a D-shaped solid which can easily be fabricated by cutting a cylindrical solid from end-to-end. The diameter of the cylinder and the position of the cut depend on the width of the main section 120 (FIG. 4A) of the channel to which the conduit assembly is ultimately to be attached. To accommodate a 38 mm (1.5 inch) wide channel, for example, a 50 mm (2.0 inch) long section of 76 mm (3.0 inch) diameter cylinder might be used. This would provide a radius-to-chord ratio "r/c" of 1.0 based on the model discussed in connection with FIG. 5. The surfaces on the cylinder should be smooth and the cylinder's ends preferably flat and perpendicular to the side. The D-shaped solid is formed by cutting the cylinder end-to-end so that the center of the resulting surface is 5 mm (0.2 inch) from the center of the curved edge. The cut is preferably perpendicular to the ends of the cylinder. The resulting surface should be rendered uniformly smooth and flat.

The second substrate 212 is a crescent-shaped solid fabricated to conform to the curvature of the first substrate 210. The second substrate 212 is easily cut from a section of tubular solid. For use with the above example, the tube might be 50 mm (2.0 inch) long with an inside diameter of about 76 mm (3.0 inch), having a wall thickness of 10 mm (0.38 inch). The exact diameter depends on the flexibility of the material used and the thickness of the first spacer 217 that will be placed between the first 210 and second 212 substrates. As with the cylinder, the surfaces on the tubular solid should be smooth and the ends preferably flat and perpendicular to the sides. The crescent-shaped solid is constructed by cutting the tube end-to-end in such a way that the arc that forms the inside surface of the tube is approximately the same length as the curved outside surface of the first substrate 210.

The third substrate 214 is typically a flat, sheet-like rectangular solid. A thickness of 10 mm (0.38 inch) is generally adequate to provide the necessary rigidity. The overall size should be equal to or larger than the outermost dimensions of the second substrate 212. Preferably, third substrate 214 is shaped to match the D-shaped silhouette of the second spacer 218 described below.

Figure 8A:
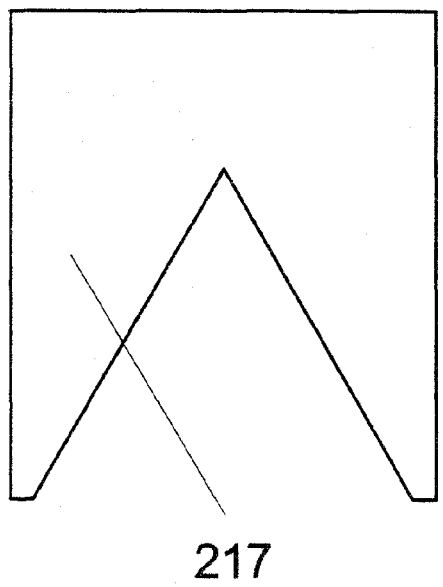
FIG. 8A shows a spacer used in construction of one embodiment of a conduit assembly.

The construction of the conduit 201 in this embodiment of the conduit assembly 200 is probably more easily described if the conduit 201 is envisioned to have an upper portion 202 and a lower portion 203 following the model described in FIG. 5. To construct the upper portion 202, the inner surface of second substrate 212 is wrapped around the first substrate 210 with an appropriately shaped and configured first spacer 217 in between. First spacer 217 is typically formed from sheet material dimensioned to match the curved surface of the first substrate 210. Its thickness is generally equal to or smaller than the thickness of the main section 120 of the channel to which the conduit 201 is to be connected. The material may be the same or different than the substrates. In one embodiment, for example, both the first 217 and second 218 spacers were made from 0.25 mm (0.010 inch) thick cellulose acetate film and used in conjunction with first 210, second 212, and third 214 substrates made from PMMA, polymethyl methacrylate. To form the upper portion 202 of the conduit 201, a triangular-shaped area is cut out of the first spacer 217 so that one side of the triangle is along the edge of the spacer 217, as shown in FIGS. 7 and 8A, and centered from side-to-side. For the example described above where the main section 120 of the channel is 38 mm, the base side of the cut-out triangle should be 41 mm in length and angles at the base should each be 61 degrees. The dimensions were calculated so that the distance between the two corners adjacent to the edge will substantially match the 38 mm width of the main section 120 of the channel when the first spacer 217 is wrapped around the curvature of the first substrate 210. Before assembling, a small hole should be made into the second substrate 212 in such a way that the hole will be located just inside the cut-out triangular area of the first spacer 217 when the conduit assembly 200 is assembled. This hole, which is the small portal 204 for the conduit 201, should be fitted with low-volume tubing to serve as inlet tube. (The inlet tube 25 will be described in connection with FIG. 12.) The inlet tube provides the means for moving fluid medium and sample particles to or from the small portal 204 in the conduit 201. Finally, this upper portion 202 of the conduit 201 is assembled by securely bonding the first spacer 217 to the curved surface of the first substrate 210 with an appropriate bonding agent or adhesive. The inner surface of the second substrate 212 is then bonded to first spacer 217. Care must be exercised to insure that the triangular cut-out area remains free of bonding agent and that the edges of all three pieces align.

Figure 8B:
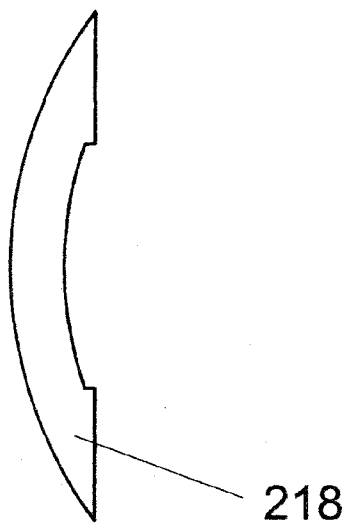
FIG. 8B shows a second spacer used in construction of one embodiment of a conduit assembly.
Figure 8C:
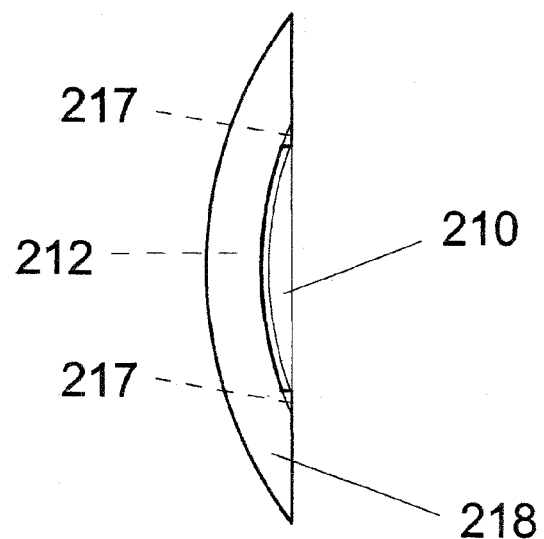
FIG. 8C shows a second spacer placed over a partially assembled embodiment of a conduit assembly.

To form the lower portion 203 of the conduit 201, the second spacer 218 is prepared having the shape shown in FIGS. 8B and 8C. FIG. 8B shows just the second spacer 218. FIG. 8C shows the second spacer 218 placed over the assembled upper portion 202 of the conduit 201 which was formed by bonding the first spacer 217 between the first 210 and second 212 substrate. To make second spacer 218, one edge of the material is cut to match the outer curvature and size of the second substrate 212. The other edge is cut straight to complete the D-shaped pattern. The open area that will be necessary for the lower portion 203 of the conduit 201 is removed from the second spacer 218 starting at the middle of the straight edge. The distance between the corners of the opening should match the width 222 of the main section 120 of the channel to which the conduit is to be attached. The curvature of the opening should also match the inside curvature of the second substrate 212. Note that when the second spacer 218 is placed over the assembled upper portion 202 of the conduit 201, an opening is present that would allow fluid medium to flow from the upper portion 202 to the lower 203 portion. To complete the construction of the conduit 201, second spacer 218 is aligned and bonded with an appropriate bonding agent or adhesive to the assembled upper portion 202 of the conduit 201. The third substrate 214 (FIG. 7) is then aligned and bonded to the second spacer 218.

When conduit assembly 200 (FIG. 7) is put into operation, fluid medium and any entrained sample particles enter through small portal 204, travel the length of the conduit 201, and then exit through large portal 206. Conduit 201 is designed so that the distance from the small portal 204 to any point along the opening of the large portal 206 is substantially equivalent. The size and shape of the conduit assembly 200 may be adjusted to accommodate any size channel from short, narrow microscale and lab-on-a-chip type systems to large, wide preparative scale devices. In some alternative embodiments of the conduit assembly 200, the bonding agent is eliminated from the construction process. Instead, the parts are held together with fasteners such as screws, bolts, or clamps, or the like. A small quantity of elastomeric sealant is generally applied to spacers 217 and 218 around the perimeter of the conduit 210 to help insure against leakage. The use of fasteners enables the conduit assembly 200 to be easily disassembled and cleaned when necessary. Bonding agents and/or fasteners also provide a means for connecting the large portal 206 in the conduit 201 to the main section 120 of a channel.

Other embodiments of the conduit assembly 200 may be constructed without the use of spacers 217 and 218 to define the conduit 201. Instead, to form the upper portion 202, the triangular-shaped area described above for spacers 217 may be machined directly into the curved surface of first substrate 210 or second substrate 212 at the appropriate location. The depth of the incised area is generally equal to or smaller than the thickness of the main section 120 of the channel to which the conduit 201 is to be connected. An area patterned after the cutout section of spacer 218 (FIG. 8B) may also be machined to a predetermined depth into first substrate 210 or third substrate 214 at the appropriate location to form the lower portion 203 of the conduit 201. The three substrates 210, 212, and 214 are then bonded or fastened to construct the conduit assembly 200 as described for FIG. 7.

Figure 10A:
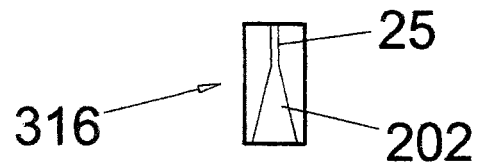
FIG. 10A shows substrate D from FIG. 9 incised to include the upper portion of a conduit and an inlet tube.

The construction procedure outline above for FIG. 7 works well for large microscale and macroscale conduits assemblies. As the dimensions decrease in size to small microscale or nanoscale conduits, however, the following alternative approach may be more applicable. This alternative approach is shown in FIGS. 9 and 10A-100. To differentiate the substrates employed in this alternative approach from those used in the description of FIG. 7, the substrates that comprise the embodiments in FIGS. 9 and 10A-C are designated as substrate A 310, substrate B 312, substrate C 314, and substrate D 316. The distinction is made to facilitate the description of the different shapes and uses for the substrates.

Substrates A 310, B 312, C 314, and D 316 may be composed of a variety of solid materials including materials that are electrically and thermally conductive, semiconductive, or nonconductive in nature, or various composites or combinations thereof. The substrates may be singular entities, layers of the above materials, or materials covered or coated with liquid or semi-liquid substances. Often, because the embodiments are microfabricated, substrate materials are selected based upon their compatibility with known microfabrication techniques, e.g. photolithography, wet chemical etching, laser ablation, air abrasion techniques, LIGA, reactive ion etching, injection molding, embossing, and other techniques. In some preferred aspects, the substrate material may include materials normally associated with the semiconductor industry in which such microfabrication techniques are regularly employed. Common materials are silica based substrates such as glass, quartz, or silicon. In other preferred aspects, the substrate may be polymeric in nature, including such plastics as polymethylmethacrylate (PMMA), polycarbonate, polytetrafluoroethylene, polyvinylchloride (PVC), polydimthylsiloxane (PDMS), polysulfone, and the like. Which ever substrate is selected, it must also be compatible with the full range of conditions to which the embodiment may be exposed in its final use. These conditions may include extreme temperatures, pH, and chemical concentrations and the application of electric fields. The substrates used in components employed in the fabrication of the embodiment may be of the same material or different.

The embodiment of the conduit assembly 200 shown as an exploded view in FIG. 9 is assembled in and around substrate A 310. For simplicity, substrates A 310, B 312, and C 314 are all shown as rectangular solids. Substrate D 316 is cylindrical in shape. The length of the cylinder should equal the thickness of substrate A 310. The optimal shape and dimensions of the rectangular substrates, however, depend on the ultimate use of the embodiment and how it is to be integrated with other devices. The equations associated with the model discussed above with FIG. 5 generally provide a useful guide in evaluating and relating the various parameters. The critical factors for substrate A 310 are its thickness and the diameter of the round hole 318 through the face of substrate A 310 to be used to accommodate substrate D 316. The thickness of substrate A 310, for example, depends on the size of the triangularly-shaped upper part 202 of the conduit 201 to be used in the construction. The height of this upper part 202 in turn depends on the width of the channel to be employed and the radius-to-chord ratio (r/c). Using a radius-to-chord ratio of 1.0 with a 250 micrometer wide channel, for example, requires that substrate A 310 be a minimum of 240 micrometers thick. The hole 318 for substrate D 316 would be 500 micrometers in diameter. Although the location of the hole 318 through the face of substrate A 310 is not critical, it is important that the sides be smooth, straight, and perpendicular to the surface of the substrate. The hole is generally positioned to accommodate other components or devices.

The main section 120 of the channel to be connected with the conduit 201 is incised into substrate B 312. One end of the incised area is rounded to the same diameter as the hole 318 in substrate A 310 to form the lower part 203 of the conduit. An inlet tube 25 (FIG. 12) is incised into substrate C 314. To prepare substrate D 316, the triangular upper part 202 of the conduit is incised into the side of the cylinder. The base of the triangle should align with one end of the cylinder. The depth of the triangular upper part 202 cut into the cylinder should be uniform and equal to or smaller than the depth of the main section 120 of the channel incised into substrate B 312. If the length of the cylinder is greater than the height of the triangular area, an inlet tube 25 is incised into the side of the cylinder to connect the small end of the triangular area to the other end of the cylinder as shown in FIG. 10A.

Figure 10B:
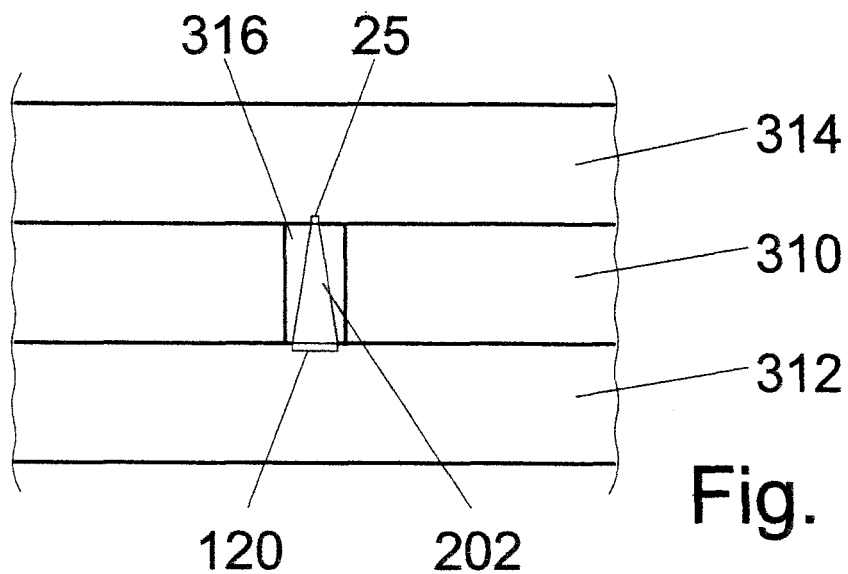
FIG. 10B shows a cross-sectional view of the assembled conduit shown in FIG. 9. The view is from a perspective looking down the length of the channel and inlet tube incised into substrates B and substrates C, respectively.
Figure 10C:
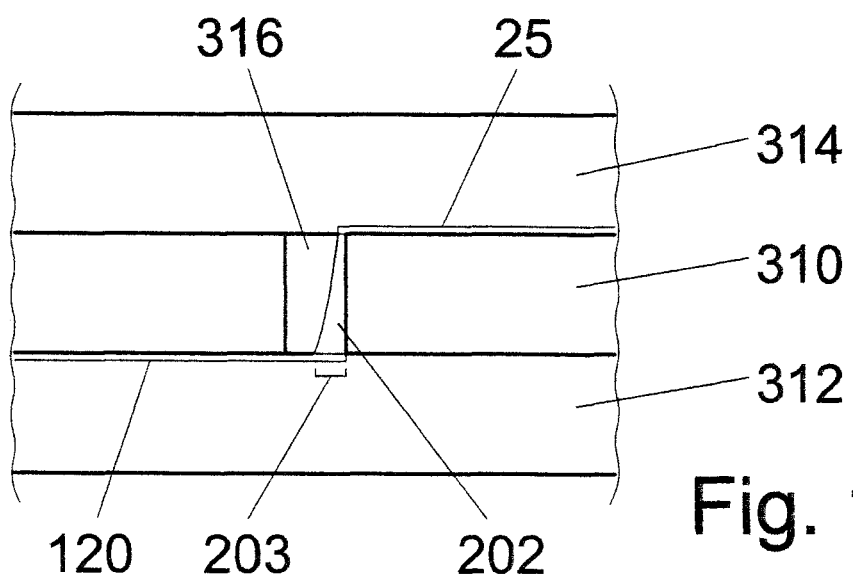
FIG. 10C shows a cross-sectional view of the assembled conduit shown in FIG. 9. The view is from a perspective looking at the side of substrate D and the side of the channel and inlet tube incised into substrates B and substrates C, respectively.

The embodiment is assembled by bonding substrate A 310 to substrate C 314 so that the inlet tube 25 in substrate C 314 aligns with the hole 318 in substrate A 310 as shown in FIGS. 10B and 10C. Cylindrically shaped substrate D 316 is then secured in hole 318 in substrate A 310 with the incised upper part 202 of the conduit or inlet tube 25 aligned with the inlet tube in substrate C 314. To complete the assembly, substrate B 312 is bonded to substrate A and aligned as shown in FIGS. 10B and 10C. The method used in bonding and securing the substrates together depends on the composition of the substrates. Techniques commonly used in microfabrication include fusion bonding, anodic bonding, adhesive bonding, eutectic bonding, solder bonding, and others and are familiar to someone knowledgeable in the art.

Figure 11:
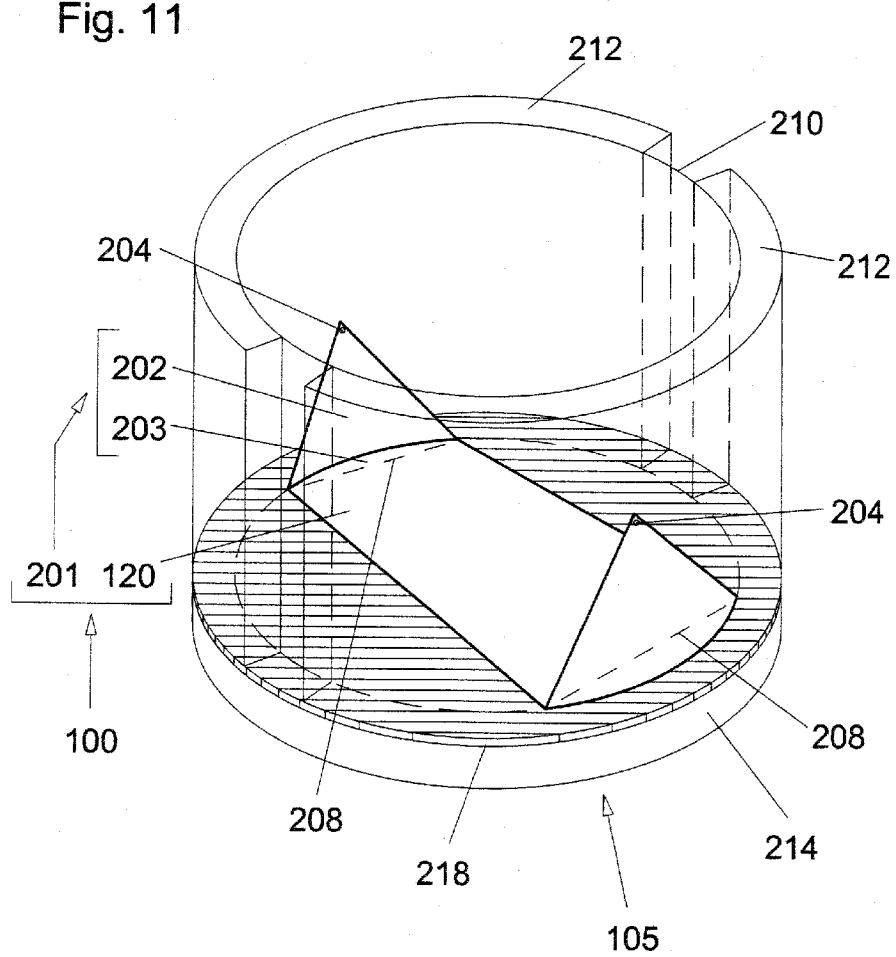
FIG. 11 shows a short channel assembly formed using two embodiments of a conduit assembly.

FIG. 11 shows one embodiment of a path-equalized channel assembly 105 formed using two conduit assemblies 200 (FIG. 7) fabricated using a single first substrate 210. As in the construction in FIG. 7, the upper portion 202 of the conduit 201 is formed between the inner surface of second substrate 212 and the curved surface of first substrate 210. In this embodiment, however, two second substrates 212 are placed on opposite sides of a single cylindrical first substrate 210, each separated from first substrate 210 by an appropriately shaped and configured first spacer 217 (FIG. 8A). For clarity, first spacer 217 is not shown in FIG. 11. The lower portion 203 of the conduit 201 and the main section 120 of the channel are formed from a single second spacer 218 and a single third substrate 214 as shown in FIG. 11. When assembled, the lower portion 203 of the conduit 201 stretches only from the inner surface of the second substrate 212 to line 208. Line 208 represents the dividing point between the large portal 206 (FIGS. 4A and 7) of the conduit 201 and the main section 120 of the channel. Together, the two conduits 201 and the main section 120 of the channel constitute one embodiment of a path-equalized channel 100. To facilitate easy disassembly for cleaning and modification, fasteners rather than bonding agents may be used to attach the third substrate 214 during the assembly of the channel assembly 105.

Figure 12:
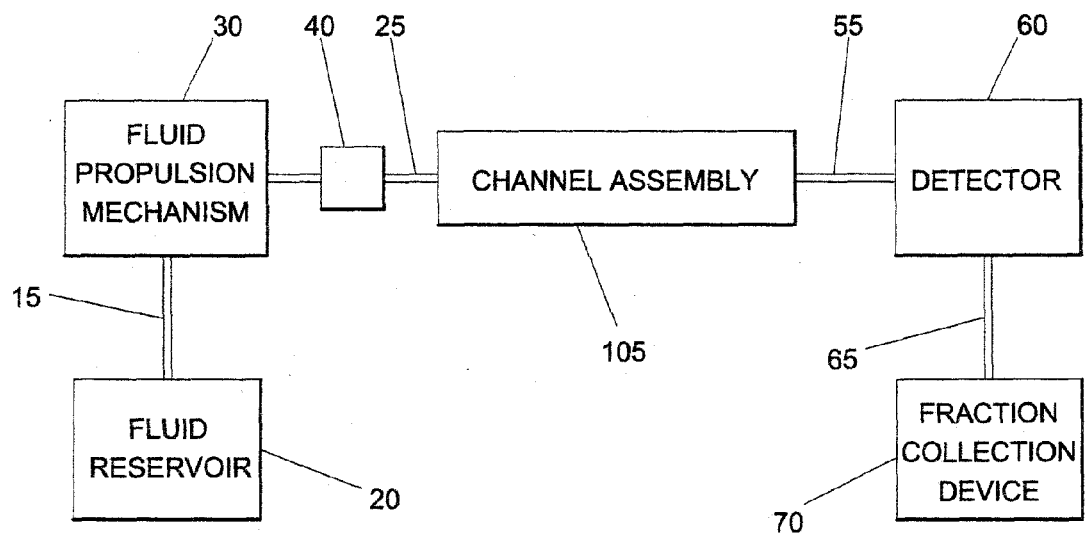
FIG. 12 shows a simplified schematic representation for a typical system designed to supply fluid medium and sample material to a process channel assembly and then detect, analyze, and/or collect the material after processing.

In operation, the channel assembly in FIG. 11 might be used as part of an entire system, one that supplies fluid medium and sample material to the channel assembly and then detects, analyzes, and/or collects the material after processing. FIG. 12 shows a simplified schematic representation for such a system. The process might be involved with manufacturing, for example, or analysis, or material separation and isolation. Fluid medium used in the process generally originates in a fluid reservoir 20. From the reservoir, the fluid is forced by a fluid propulsion mechanism 30 through the channel assembly 105 and finally to the detector 60 and a fraction collection device 70, if collection is desired. Sample particles to be processed may be added directly into the fluid reservoir 20 or introduced into the system using an injection device 40 placed typically in inlet tube 25 between the fluid propulsion mechanism 30 and channel assembly 105. For a macro-scale bench-top system, a six-port loop injector valve as commonly employed in liquid chromatography is suitable for this purpose, although other means may work equally well.

The fluid propulsion mechanism 30 in the system may be of any design, but should be able to impel the fluid medium in a constant, pulse-free stream. The flow rate depends on the particular application, but may vary from as low as 1 nanoliter/second for nano-scale analytical systems to multiple liters/second in large-scale preparative or manufacturing work. Syringe, peristaltic, and well-damped reciprocating type pumps are common for larger applications. Fluid propulsion techniques employing centrifugation, pressure, acoustics, or electrokinetics are typical with nano- and micro-scale systems. Flow rate control may be an integral part of the propulsion mechanism 30. To monitor or analyze materials as they exit from the channel assembly 105, one or more detectors may be incorporated into the system. The detector 60 may be a conventional liquid chromatography or gel permeation chromatography detector, for example, such as an ultraviolet/visible absorption detector or fluorescence detector. More specific information about various material parameters may be gleaned, however, by using a device such as a multi-angle laser light scattering (MALS) detector or one designed to provide direct chemical analysis such as an inductively coupled plasma spectrometer coupled directly to a mass spectrometer (ICP-MS). The detector 60 is preferably interfaced with a personal computer (not shown) for subsequent data handling and analysis. The computer may also be used to automate the injection device 40 and fraction collection device 70, and control the flow rate provided by the fluid propulsion mechanism 30.

To minimize band spreading and loss of resolution once sample materials have been introduced into the system, low volume inert tubing is generally used for all interconnections between components. This includes inlet tube 25 between fluid propulsion mechanism 30 and channel assembly 105, outlet tube 55 joining channel assembly 105 to detector 60, and fluid communication line 65 connecting detector 60 to fraction collection device 70. Many macro-scale applications use PEEK (polyetheretherketone) or stainless steel tubing. In most nano- and micro-scale systems, the fluid communication lines are engraved directly in the substrate employed to construct the system. Fluid communication line 15 between the fluid reservoir 20 and the fluid propulsion mechanism 30 generally need not be low volume.

The design using a single cylindrical first substrate 210 described in FIG. 11 works well with short and/or wide path-equalized channel assemblies 105. For larger and narrower channels 110, a more elongated first substrate 210 may be more appropriate as in the embodiment shown in FIG. 13. The first substrate 210 may be machined to the appropriate shape from a single block of material or fabricated from smaller components. FIG. 14A, for example, shows an exploded view of first substrate 210 constructed from two D-shaped sections, cut from a cylinder as in FIG. 7, secured to both ends of a rectangular section. The rectangular section may be fabricated from materials or components that may be used in the final channel 100 to produce or assist in the process for which the channel assembly 105 is being constructed. Before assembling the upper portion 202 of the two conduits 201 in FIG. 13, a small hole should be made into each second substrate 212 in such a way that the hole will be located just inside the cut-out triangular area of the first spacer 217 when the conduit assemblies 200 are assembled. This hole, which is the small portal 204 for the conduit 201, should be fitted with appropriate tubing to serve as inlet tube 25 or outlet tube 55 described in FIG. 12. To assemble, each first spacer 217 (FIG. 8A) is aligned and bonded to the appropriate curved surface of the first substrate 210 with a bonding agent or adhesive and the inner surface of each second substrate 212 is then aligned and bonded to first spacer 217 using the same procedures as described in FIGS. 7 and 11. Alternatively, by using fasteners rather than bonding agents, the upper portion 202 of the conduit 201 may be readily separated from the rectangular section of the first substrate 210 and the conduit 201 may be easily disassembled for cleaning and adjustment.

Figure 13:
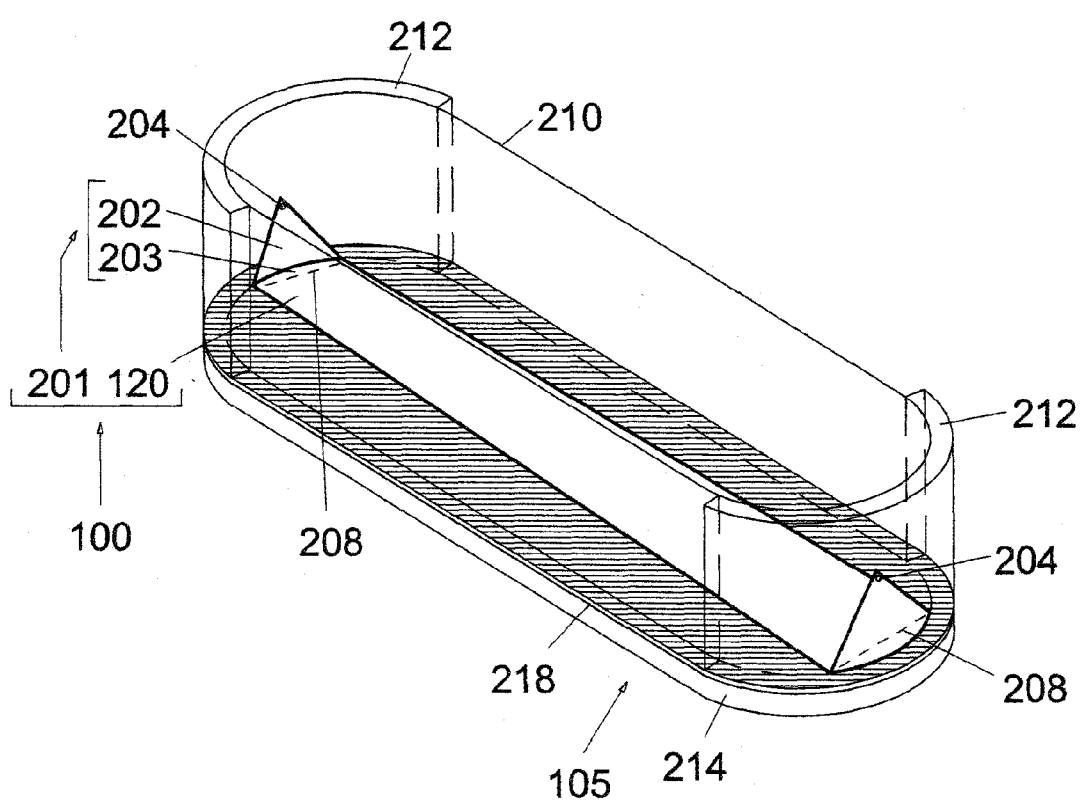
FIG. 13 shows a long channel assembly formed using two embodiments of a conduit assembly.
Figure 14A:
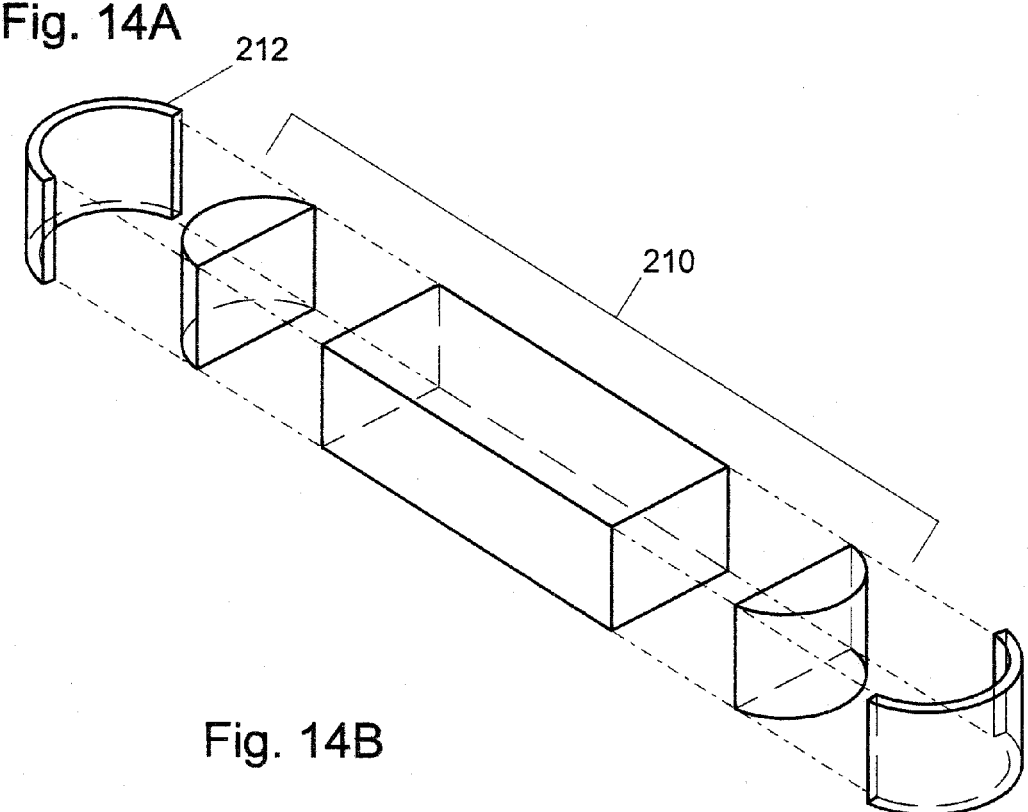
FIG. 14A shows an exploded view of components used to construct the upper portion of the conduit assembly in FIG. 13.
Figure 14B:
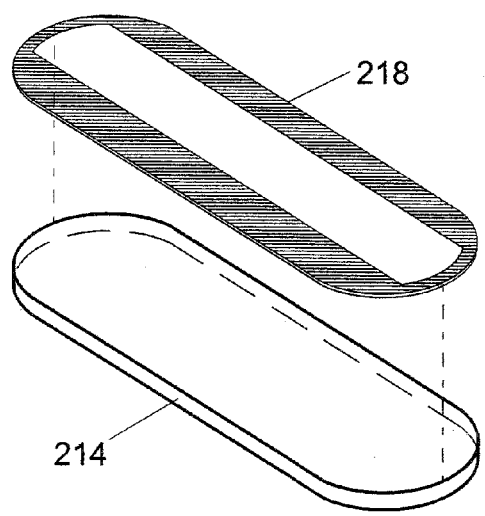
FIG. 14B shows an exploded view of components used to construct the lower portion of the conduit assembly in FIG. 13.

To complete the construction of the channel assembly 105 in FIG. 13, the second spacer 218 is prepared generally having the same thickness as first spacer 217 and the shape shown in FIGS. 13 and 14B. An area is removed from the center of spacer 218 to form the lower portion 203 of the conduit 201 and the main section 120 of the channel. The sides of the cutout area should be parallel and spaced to equal the distance across the opening in the upper portion 202. The curved ends of the cutout area should also match the inside curvature of the second substrate 212. When the second spacer 218 is placed over the assembled upper portion 202 of the conduit 201, an opening should be present that would allow fluid medium to flow between the upper portion 202 and the lower 203 portion. The third substrate 214 should be the same size or larger than the second spacer 218 and of appropriate thickness. As shown in FIGS. 13 and 14B, the general shape of third substrate 214 and second spacer 218 may be the same. The channel assembly 105 in FIG. 13 is completed by aligning and bonding or fastening second spacer 218 and third substrate 214 to the previously assembled upper portion 202. As in FIG. 11, the lower portion 203 of the two conduits 201 stretches only from the inner surface of the respective second substrates 212 to line 208. Line 208 represents the dividing point between the large portal 206 (FIG. 7) of the conduit 201 and the main section 120 of the channel. The area between the two lines 208 becomes main section 120 of the channel. Together, the two conduits 201 and the main section 120 form the channel 100 within one embodiment of a path-equalized channel assembly 105.

Figure 15:
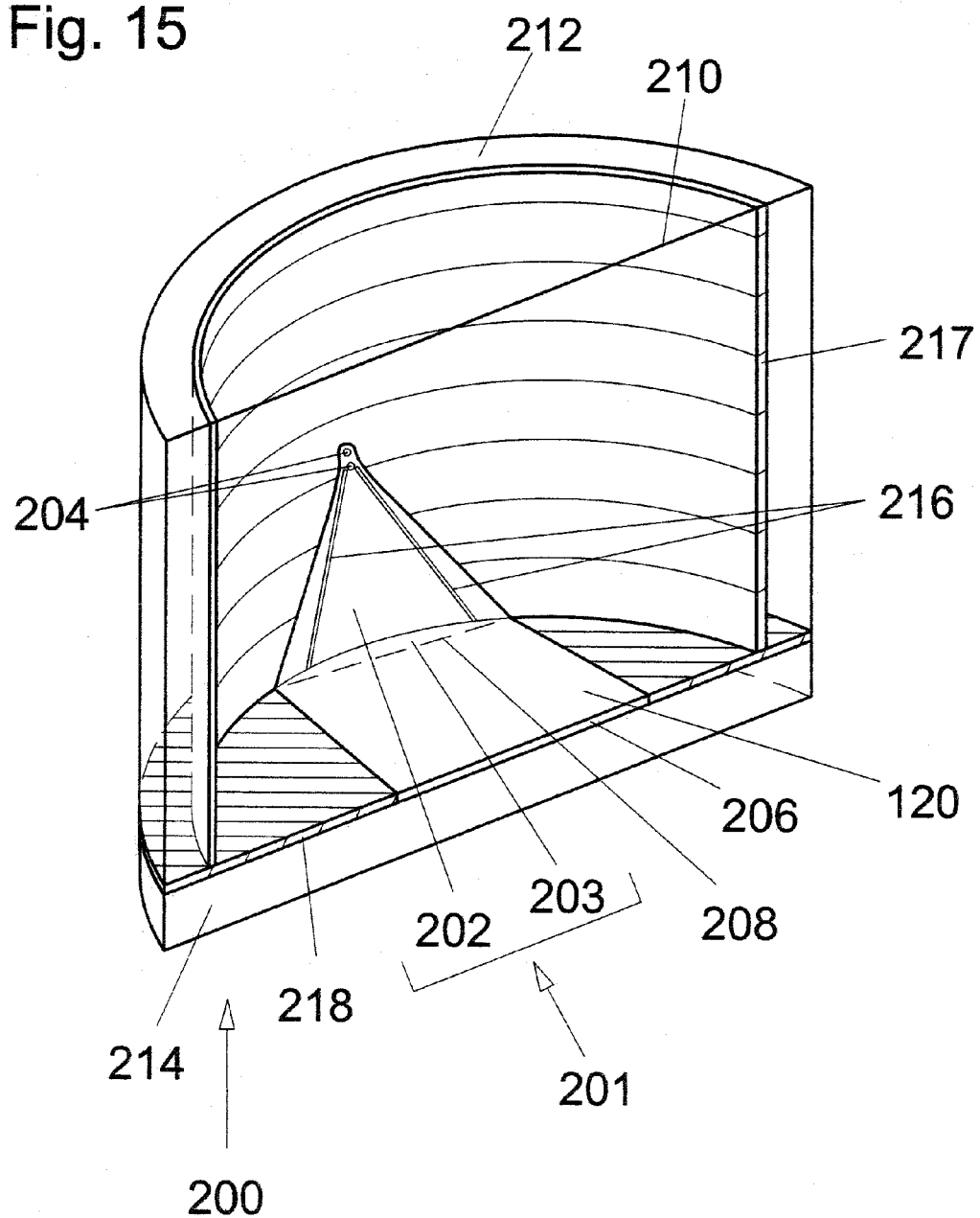
FIG. 15 shows the main section of a channel connected to an embodiment of a conduit assembly that is segmented in three areas and incorporates two small portals.
Figure 16A:
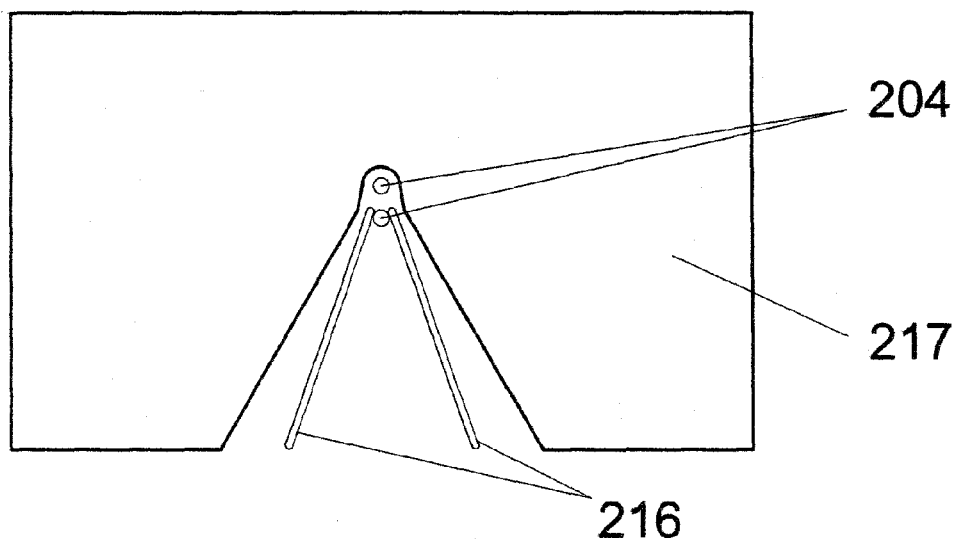
FIG. 16A shows a first spacer that may be employed in the construction of the upper portion of the conduit assembly in FIG. 15 when the conduit is to be used to facilitate the introduction of fluid medium and sample particles into a process channel.

Other embodiments of the invention enable fluid medium and/or samples particles to be delivered or collected from a main section 120 of the channel through multiple portals, side-by-side. For example, FIG. 15 shows the main section 120 of the channel connected to a conduit 201 that is segmented into three areas and incorporates two small portals 204. The design allows sample particles to travel along the center of channel 120 shielded from the edges of the channel by parallel flowing streams of fluid medium. As in the earlier embodiments, the upper portion 202 of the conduit 201 in FIG. 15 is constructed with first spacer 217 sandwiched between the first 210 and second 212 substrate. To facilitate the correct alignment, first spacer 217 is first bonded or fastened to the second substrate 212. Spacer 217 is designed to include two narrow partitions 216 that are placed so that they proceed from either side of the lower of two small portals 204 in second substrate 212 to the bottom of the triangular area as shown in FIGS. 15 and 16A. Once installed on second substrate 212, spacer 217 is aligned and bonded or fastened to first substrate 210. The lower portion 203 of the conduit 201 may then be formed using second spacer 218 and third substrate 214 as described for FIGS. 7, 11, 13 and 14B.

When conduit assembly 200 in FIG. 15 is placed into operation, sample particles entrained in fluid medium will be introduced through the lower small portal 204. Fluid medium flowing through the upper small portal 204 will wash over the lower small portal 204 and carry the sample particles into the main section 120 of the channel. Fluid medium from the upper small portal 204 will also flow on the outside of the partitions 216 forming the parallel flowing streams that will shield the sample particles from the edges of the channel 120. Separate inlet tubes 25 from the fluid propulsion mechanism 30 in FIG. 12 may be used to supply fluid medium to the upper and lower small portals 204 on the conduit 201. The conduit 201 and main section of the channel 120 in FIG. 15 are part of the channel assembly shown in FIG. 12. Injection device 40 may be incorporated into the inlet tube 25 supplying the lower portal 204 in FIG. 12. Either a separate device or a device within the fluid propulsion mechanism 30 may be used to control the relative flow of fluid medium through the two small portals 204. When designed and operated correctly, no sample particles enter the parallel flow streams and the flow rate of fluid medium is substantially uniform across the width of the main section 120 of the channel.

Figure 16B:
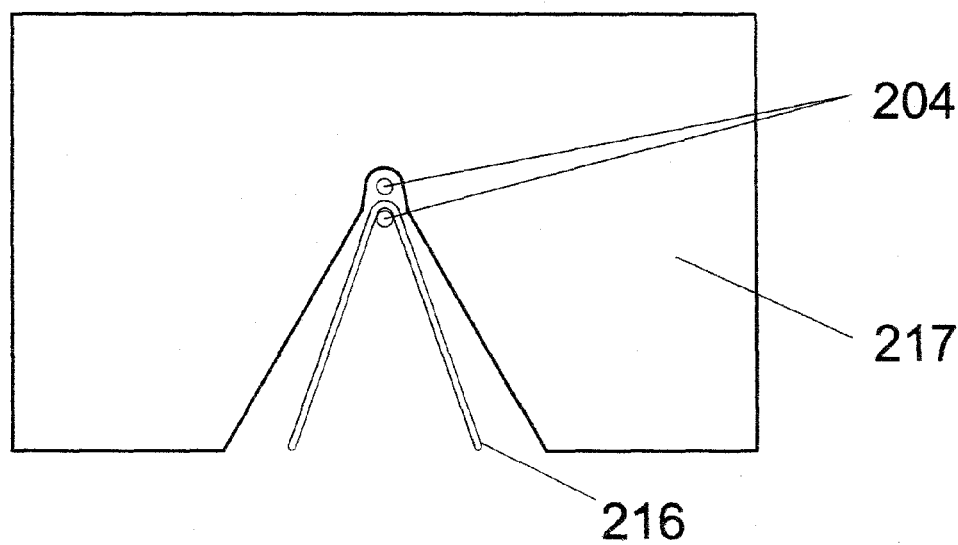
FIG. 16B shows a first spacer that may be employed in the construction of the upper portion of the conduit assembly in FIG. 15 when the conduit is to be used to facilitate the collection of fluid medium and sample particles from a channel.

To accommodate the collection of sample particles at the other end of the main section 120 of the channel, a conduit 201 of slightly different design is employed than the one shown in FIG. 15. Although assembled as described above, first spacer 217 here is designed to isolate the fluid medium containing the sample particles from the parallel flow streams used to separate the particles from the edges in the main section of the channel 120. The narrow partition 216 circumscribes the lower small portal 204 in a way that prevents fluid medium from inside the partition from reaching the upper small portal 204. The arrangement is shown in FIG. 16B. The small portals 204 shown in FIGS. 16A and 16B are not part of first spacer 217. The portals 204 are shown for reference to better illustrate the positioning of the partitions 216. Fluid from the upper small portal 204 leaves the conduit 201 through outlet tube 55 (FIG. 12) to a collection container while the sample particles entrained in the fluid medium exit substantially through the lower small portal and a second outlet tube 55 to detector 60. Although the use of parallel flow streams has appeared in prior art to minimize edge effects, the present embodiments possess two distinct advantages compared with the earlier examples (Giddings et al., 1984). One, as with other embodiments of the present invention, the design in FIG. 15 substantially eliminates band spreading due to end effects. And two, the present design avoids diluting the sample particles with the fluid medium used in the parallel flow.

Figure 18:
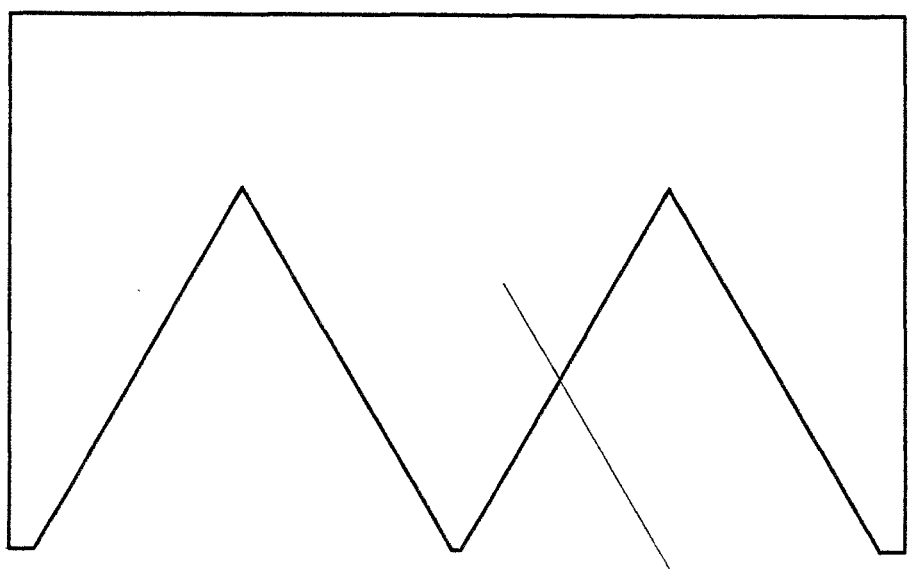
FIG. 18 shows a first spacer that may be used in the construction of the upper portion of the multiple side-by-side conduits in FIG. 17A.

Another embodiment of the invention enables fluid medium and/or sample particles to be delivered to or collected from main section 120 of the channel through multiple side-by-side small portals. This side-by-side arrangement may be utilized in two-dimensional systems, for instance, where two processes, generally at 90 degrees to each other, are performed simultaneously across the channel. Chromatography or field-flow fractionation could occur in one direction, for example, and electrophoresis in the other. The cumulative effect of the two processes could cause sample particles to segregate into select aggregates both down the length and across the width of the channel. As the particles are carried by the fluid medium to the end of the channel, multiple small side-by-side portals enable the aggregates to be collected and isolated individually. To construct this embodiment, components described for FIGS. 14A and 14B may be modified and coupled together as shown in the exploded view in FIGS. 17A and 17B. FIG. 18 provides an illustration of an appropriate first spacer 217. The upper portion 202 of the conduit 201 is fabricated with first spacer 217 (FIG. 18) sandwiched between the first 210 and second 212 substrates (FIG. 17A) as described for earlier embodiments. Once assembled, second spacer 218 and third substrate 214 are attached to form the lower portion 202 of the conduit 201. Appropriate bonding agents and/or fasteners may be used. For the purpose of illustration, FIGS. 17A and 17B show components that may be used to construct an embodiment possessing two independent small portals 204 for introduction of fluid medium and/or sample particles into a main section 120 of the channel and two independent small portals 204 for collection. The number of introduction and collection small portals 204, however, need not be equal and may be expanded by simply coupling additional components together.

Figure 19C:
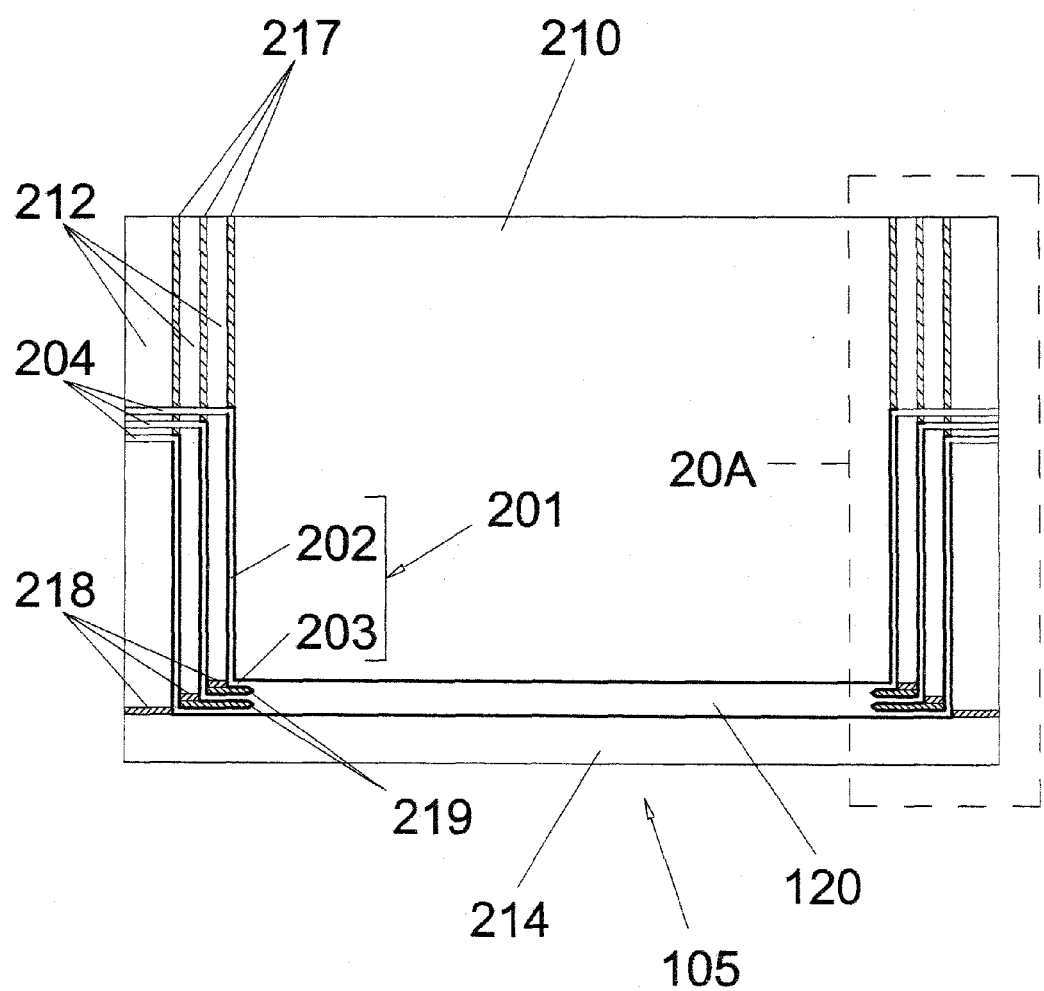
FIG. 19C shows a channel assembly from a perspective perpendicular to fluid medium flow through the channel that provides a view across the thickness of the channel. This represents the sectional view from FIG. 19A taken at section line 19C-19C.

In other embodiments, multiple portals are stacked, enabling the isolation and collection of sample particles that have aggregated into equilibrium zones across the thickness of the main section 120 of the channel. Such an arrangement is shown in the embodiment in FIGS. 19A and 19C, for example, from two different viewpoints. FIG. 19A shows a channel assembly 105 from a perspective perpendicular to fluid medium flow through the main section 120 of the channel that provides a view across the width of the channel 120. FIG. 19C is from the same perspective but provides a view across the thickness of the main section 120. This represents the sectional view from FIG. 19A taken at section line 19C-19C. The construction techniques here are similar to those described above except that additional spacers and substrates are required. As in the embodiment shown in FIG. 11, two second substrates 212 are placed on opposite sides of a single cylindrical first substrate 210, each separated from first substrate 210 by an appropriately shaped and configured first spacer 217 (FIG. 8A). Each second substrate 212 contains a small hole to serve as the small portal 204 positioned so that the hole is just inside the cut-out triangular area of the first spacer 217 when the conduit assembly 200 is assembled. The configuration of the hole is such that it may be fitted with low-volume tubing through the narrow thickness of the second substrate 212 to serve as an inlet tube 25 or outlet tube 55 as described for FIG. 12. The thickness of second substrate 212 need only be thick enough to accommodate the dimensions of the tubing.

To provide a second portal 204 to this stacked embodiment shown in FIGS. 19A and 19C, another first spacer 217 is wrapped around the previously installed second substrate 212 followed by another second substrate 212. This process is repeated for each successive portal 204. Each layer is secured with appropriate bonding agents or fasteners. To form the lower portion 203 of each conduit 201 and the main section of the channel 120, alternating second 218 and third 219 spacers are installed and finally capped with the third substrate 214 as shown in FIG. 19C. The second 218 and third 219 spacers are aligned as shown in FIGS. 19B and 19C with the end of the opening in third spacer 219 generally defining the end of the main section of the channel 120. Line 208 in FIGS. 19A and 19B shows the dividing line between the lower portion 203 of the conduits 201 and the main section of the channel 120.

Figure 20A:
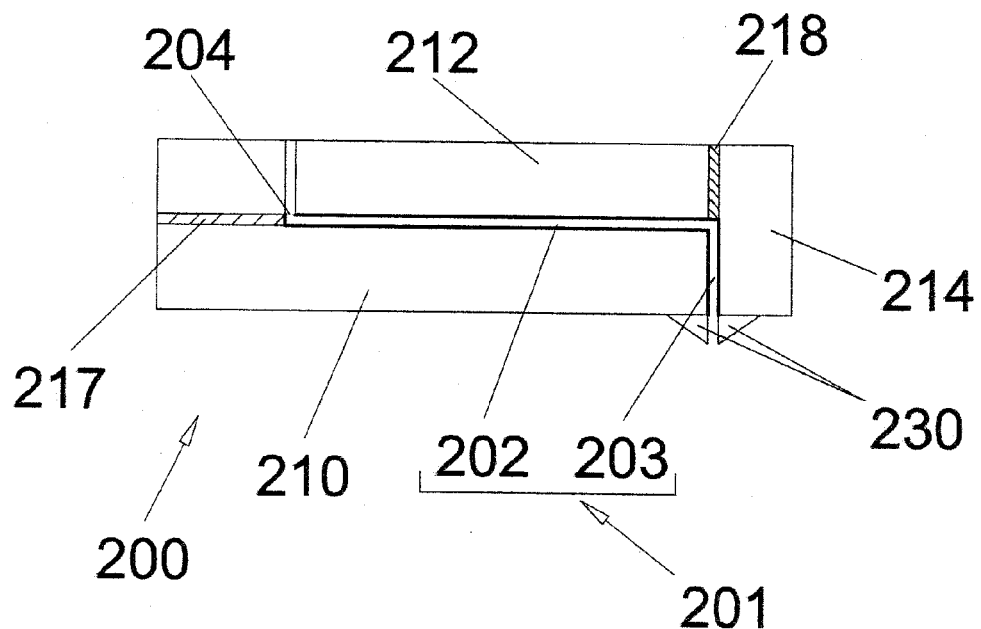
FIG. 20A shows a channel assembly that may be used to deliver or collect fluid medium and any entrained sample material to or from a surface or open volume.
Figure 20B:
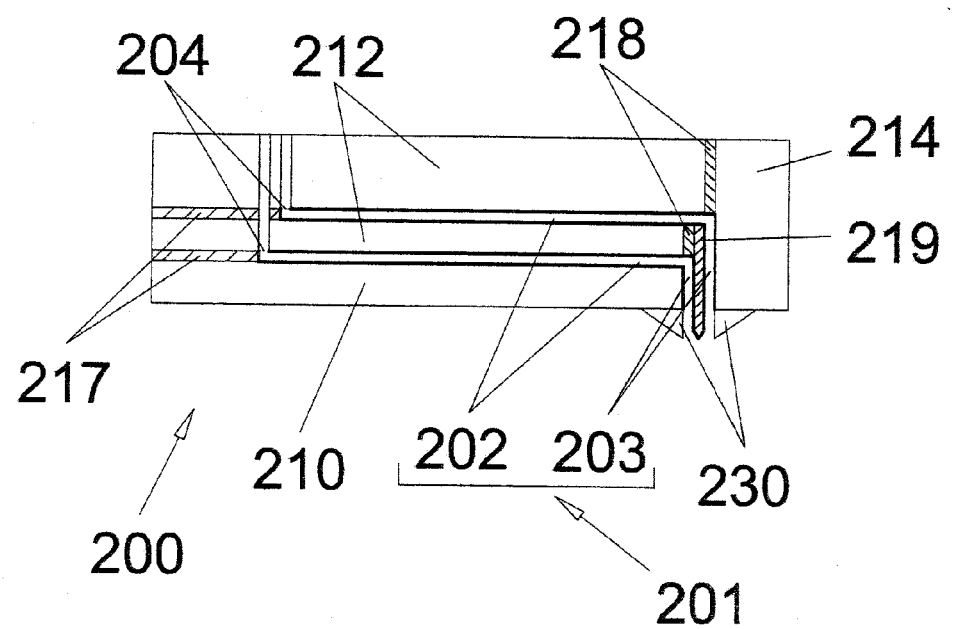
FIG. 20B shows two adjacent channel assemblies that may be used to deliver and/or collect fluid medium and any entrained sample material to and/or from a surface or open volume.

FIGS. 20A and 20B show embodiments of a conduit assembly 200 that may be used to deliver or collect sample material from a surface or an open volume. The figures show modified versions of the conduits 201 encircled by the dashed line labeled 20A on the right-hand side of FIG. 19C. The view, however, is rotated 90 degrees. Also, unlike the embodiment in FIG. 19C, the embodiment in FIG. 20A comprises only a single conduit 201. FIG. 20B shows an embodiment that comprises two conduits 201 placed adjacent to each other. Again, unlike the conduits 201 in FIG. 19C that function in association with a process channel 120, the conduits 201 shown in FIGS. 20A and 20B empty into or collect from surfaces or open volumes. The embodiments in FIGS. 20A and 20B are constructed using the same materials, techniques, and configurations as described above for the embodiment in FIGS. 19A, 19B, and 19C and described previously for FIG. 7. The principal difference is that sampling strips 230 may be required to properly align the conduit 201 for sample delivery or collection. Alternatively, the shape and configuration of the first 210, second 212, and third 214 substrates may be slightly altered to serve the same purpose.

As shown in and described for FIG. 7, the first substrate 210 is a D-shaped solid which can easily be fabricated by cutting a cylindrical solid from end-to-end. The cut is preferably perpendicular to the ends of the cylinder. The resulting surface should be rendered uniformly smooth and flat. The second substrate 212 is a crescent-shaped solid fabricated to conform to the curvature of the first substrate 210. The crescent-shaped solid is constructed by cutting a tube end-to-end in such a way that the arc that forms the inside surface of the tube is approximately the same length as the curved outside surface of the first substrate 210. As in FIG. 7, a small hole is made into the second substrate 212 to serve as the small portal 204 of the conduit 201. The third substrate 214 is typically a flat, sheet-like rectangular solid. Preferably, third substrate 214 is shaped to match the D-shaped silhouette of the first 210 and second 212 substrates when assembled. The shape and characteristics of the first 217 and second 218 spacers were previously described for FIGS. 7 and 8A-C.

To construct the upper portion 202 of the conduit 201 in FIG. 20A, the inner surface of second substrate 212 is wrapped around and bonded to the first substrate 210 with an appropriately shaped and configured first spacer 217 in between. To complete the construction of the conduit 201, second spacer 218 is aligned and bonded to the assembled upper portion 202 of the conduit 201. The third substrate 214 is then aligned and bonded to the second spacer 218. For ease in disassembly and cleaning when necessary, fasteners may be used in lieu of bonding agents or adhesives. Sampling strips 230 may be added and configured at the end of the lower portion 203 of the conduit 201 as needed to facilitate fluid medium and/or sample collection or delivery from or to a surface or open volume.

FIG. 20B is constructed in much the same fashion. To provide a second portal 204 to the embodiment shown in FIG. 20A, another first spacer 217 is wrapped around the previously installed second substrate 212 followed by another second substrate 212. This layer is again secured with appropriate bonding agents or fasteners. To form the lower portion 203 of each conduit 201, the second 218 and third 219 spacers are installed and finally capped with the third substrate 214 as shown in FIG. 20B and sampling strips 230 are affixed. The third 219 spacer is D-shaped and is generally designed to extend to and align with the outer edge of the sampling strips 230.

With two adjacent conduits 201, several operational options are available for the embodiment. If desired, for example, each conduit 201 may be used to deliver a different fluid medium and/or sample material to a surface or open volume aligned with the sampling strips 230 at the ends of the lower portion 203 of the conduits 201. The delivery process may be either simultaneously or sequentially. The surface or volume may be stationary or moving relative to the conduit assembly 200. Alternatively, the conduits 201 may be used to collect material from a surface or volume. By employing filters or other selection devices, each conduit 201 may be directed to collect samples with a different characteristic. Another alternative is to have one conduit 201 delivering fluid medium (and possibly entrained material) to the surface or open volume and the second conduit 201 collecting fluid medium and material. This process works well when it is necessary to dissolve or dislodge sample material before it can be collected.

Figure 21:
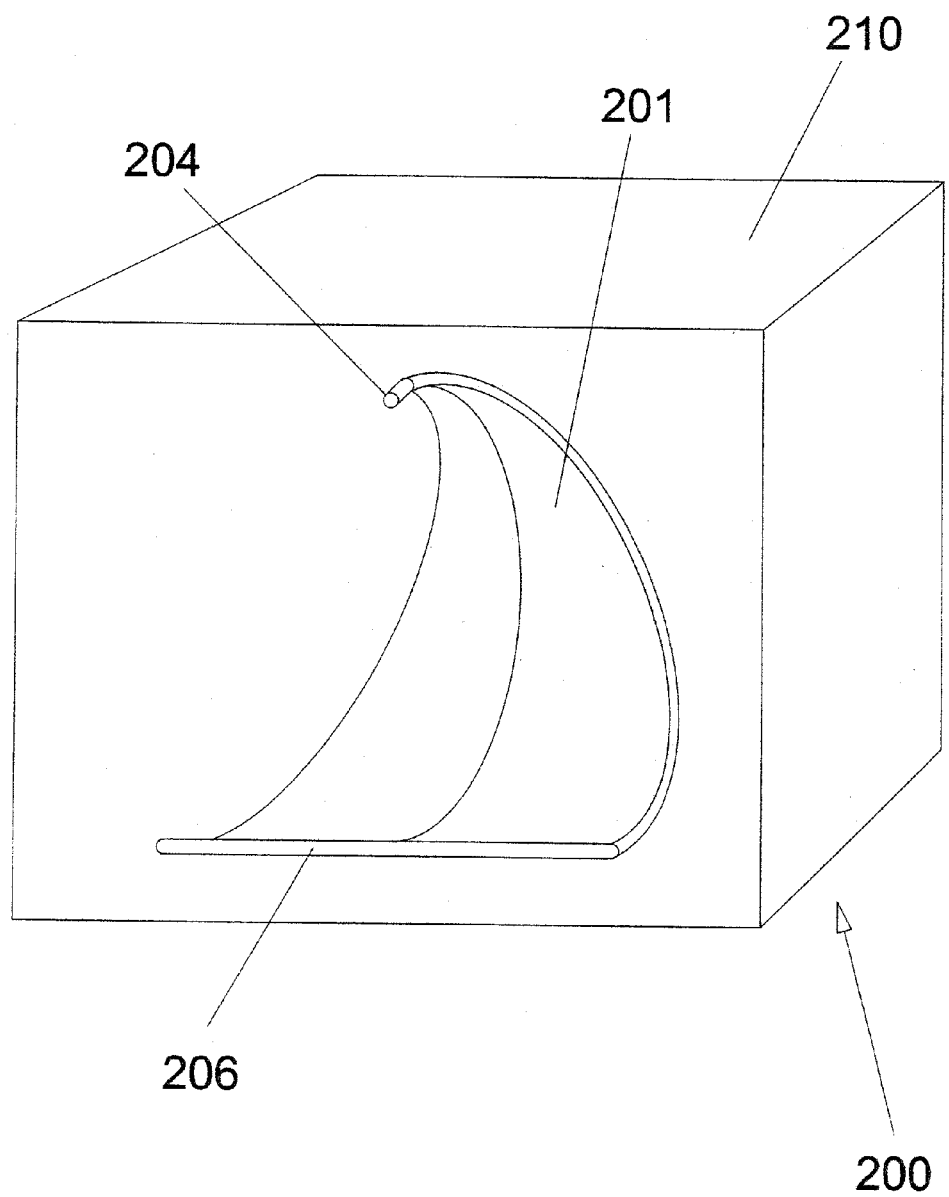
FIG. 21 shows an embodiment fabricated using CNC machining to produce the shape of the conduit.

Other fabrication techniques and configurations for the conduit may also be used. For example, an appropriately programmed CNC milling machine can easily impart the shape of a conduit 201 into a block of first substrate 210. The principal requirement is that the conduit 201 be designed so that the distance from the small portal 204 through the conduit 201 to any position along the opening of the large portal 206 is substantially equivalent. In essence, the conduit enables the flow of fluid medium from a location of small cross-sectional area, the small portal (possibly a point), to a location of large cross-sectional area, the large portal (possibly represented substantially by a line). With few restrictions placed on the shape of the conduit 201, it is often convenient to express the contour of the conduit mathematically. Since the distance from a point to a line is not constant in two-dimensional space, the conduit can only be visualized and constructed using a third dimension. For example, the contour may take the form of a surface generated from the arc of a circle between the point and varying positions on the line. The length of the arc is kept constant. Only the radius of the circle is varied to accommodate the changing two-dimensional distance between the point (small portal 204) and the positions on the line (large portal 206). Other geometric shapes also work well. After using a CNC milling machine to cut out the appropriate contour in a block of first substrate 210, another piece of first substrate 210 is machined to complement the first piece leaving suitable space within the shape of the conduit for the passage of fluid medium. The first 210 and second 212 substrates may be bonded together with an appropriate bonding agent or adhesive. Alternatively, the substrates 210 and 212 may be joined with appropriate fasteners. The resulting conduit assembly 200 might resemble the embodiment shown in FIG. 21.

The following is a method that may be used for delivering fluid medium and materials between a first location 226 (FIG. 3) and a second location 228 using the apparatus described above as the present invention. The second location 228 may be a process channel, a surface, or an open volume. The method substantially eliminates the end effects generally associated with transferring fluid and entrained materials from a smaller or narrower space to a larger or wider space. Any of the many embodiments may be used.

Figure 22:
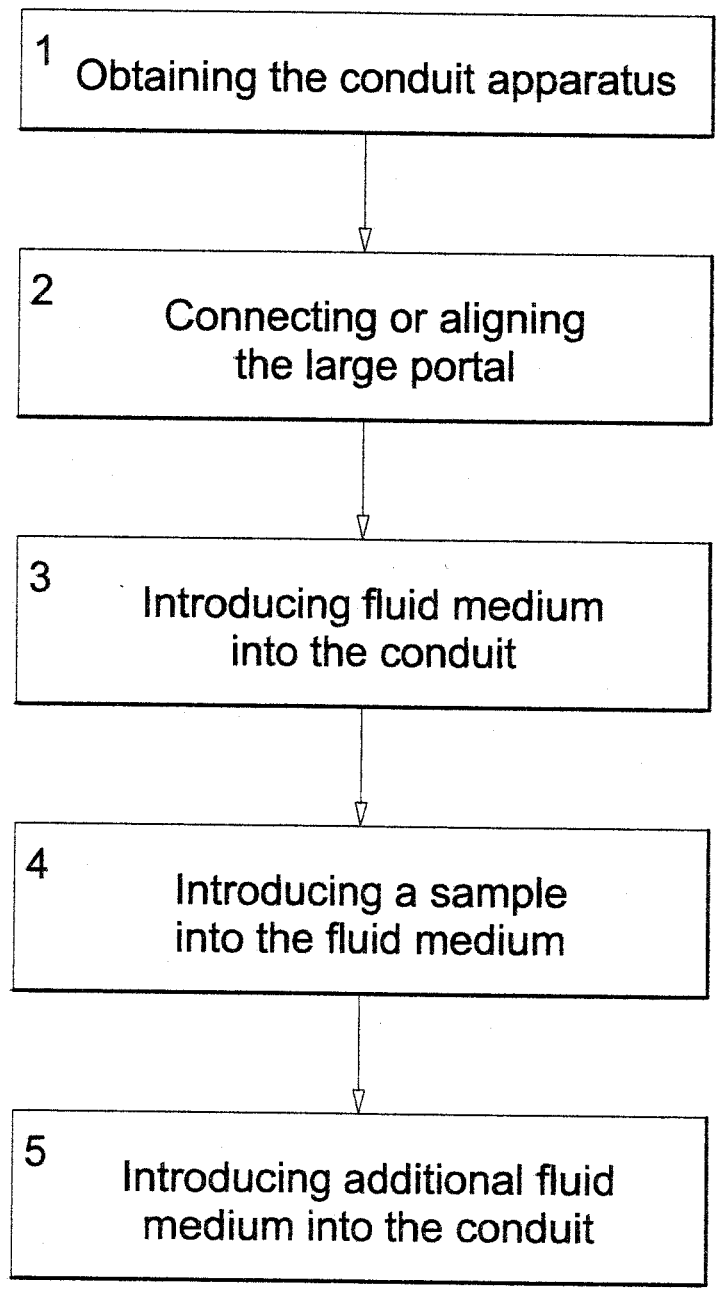
FIG. 22 shows a flowchart of a typical method for delivering fluid medium and materials, with a minimum of band spreading and dispersion due to edge effects, from a first location to a second location possessing a different cross-sectional area

In a non-limiting exemplary embodiment, as shown in a flowchart in FIG. 22, the method preferably comprises five steps: (1) Obtaining a apparatus described as the present invention. (2) Connecting or aligning the large portal in the conduit as necessary to connect to the main section of a channel or align with the desired surface or open volume. (3) Introducing fluid medium into the conduit of the apparatus via its small portal until the conduit is filled with the fluid medium. (4) Introducing a sample of material into the fluid medium in the conduit. (5) Introduce additional fluid medium at a predetermined flow rate into the conduit via its small portal. The fluid medium travels through the conduit and exits by way of the large portal. Since the particles of material that comprise the sample follow substantially equal length paths through the conduit from the small portal to the large portal, end effects are substantially eliminated.

Figure 23:
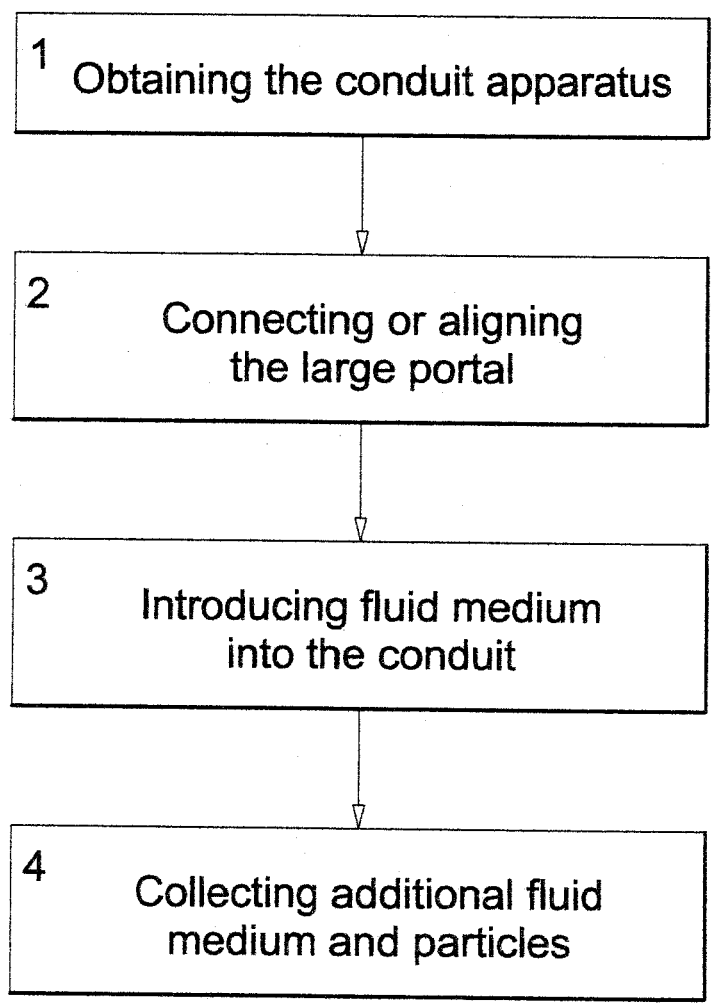
FIG. 23 shows a flowchart of a typical method for collecting fluid medium and materials, with a minimum of band spreading and dispersion due to edge effects, from a second location to a first location possessing a different cross-sectional area Those skilled in the art will appreciate that the figures are not intended to be drawn to any particular scale; nor are the figures intended to illustrate every embodiment of the invention. The invention is not limited to the exemplary embodiments depicted in the figures.

A similar method may be used for collecting fluid medium and materials from a second location 228 (FIG. 3) using the apparatus described above as the present invention. Again, the second location 228 may be a process channel, a surface, or an open volume. This method also substantially eliminates end effects. Any of the many embodiments of the invention may be used. As shown in a flowchart in FIG. 23, the method comprises four steps. (1) Obtaining an apparatus described as the present invention. (2) Connecting the large portal in the conduit as necessary to the main section of a channel or aligning with a desired surface or open volume. (3) Introducing fluid medium into the conduit of the apparatus via its large portal until the conduit is filled with the fluid medium. (4) Collecting any additional fluid medium and any entrained materials entering by way of the large portal of the conduit. The fluid medium and materials then travel through the conduit and exit by way of the small portal. Again, since the material particles that comprise the sample follow substantially equal length paths through the conduit from the large portal to the small portal, end effects are substantially eliminated.

The steps in the above two methods may be expanded, combined, and/or their order changed to accommodate the requirements of the specific sample, application, and/or embodiment of the apparatus employed. Greater detail and alternative versions of the methods are given below. The methods should be familiar to one skilled in the general art of moving fluid media and entrained materials between locations of different dimensions.

Under normal operating conditions, the conduits and main section of the process channel are prefilled with fluid medium by pumping the fluid medium, as described for FIG. 12, from a fluid reservoir 20, through an injection device 40, and into the channel assembly 105 where the conduits and channel are located. If the conduit is to be used to deliver fluid medium and materials to a surface or open volume, no channel would be present. Fluid medium would be prefilled as above but only up to the large portal of the conduit. It may be necessary to free the liquid fluid medium of dissolved gases to prevent the formation of bubbles in the channel due to outgassing. Once the conduits and channel are filled, the injection device 40 is used to insert the sample particles into the channel assembly 105 as fluid medium continues to flow at an appropriate flow rate. Conditions appropriate for the process are then applied to the channel or the conduits and the channel. Alternatively, the order may be switched; the appropriate process conditions may be initiated before the introduction of the sample. For some applications, it may be desirable to use a stop-flow technique to provide sufficient time for sample processing before resuming fluid medium flow. Other considerations may also be important if the conduit is to be used to deliver fluid medium and materials to a surface or open volume.

Sample volumes and concentrations depend on the application and the design of the apparatus. Care, however, needs to be taken and the methods and apparatus may require alteration to avoid excessive spreading of the band of sample particles when the apparatus is used particularly with some techniques. Field-flow fractionation (FFF), for example, would be one such technique. Above a certain point, separation resolution in FFF can become a function of the size of the sample. The steady state equilibrium zones that form in the channel during the separation process are three-dimensional in nature with a breadth (across the thickness of the channel), a width (across the width of the channel), and a span (along the length of the channel). Increasing the volume of the sample generally also increases the span of each zone. The breadth is restricted by the balancing of opposing equilibrium forces. Ultimately, if the sample becomes large enough, the zones stretch from one end of the channel to the other. There is no differentiation of the zones along the length of the channel. Resolution of the zones is then only possible across the thickness direction of the channel. To isolate the individual zones, a different conduit (and detector) must be provided for each zone. For example with five zones, one conduit could be used to introduce the sample into the channel, but five conduits (one for each zone) stacked across the thickness of the channel would be required to collect the separated particles. The method would also have to be modified to reflect the fact that the zones are collected simultaneously rather than one at a time. Similar alterations to the method would be necessary if two-dimensional techniques were used as discussed earlier, but the multiple conduits would be installed side-by-side.

While exemplary embodiments of the invention have been described, it should be apparent that modifications and variations thereto are possible, all of which fall within the true spirit and scope of the invention. With respect to the above description then, it is to be realized that the optimum relationships for the components, including variations in order, form, content, function, and manner of operation, are deemed readily apparent and obvious to one skilled in the art, and all equivalent relationships to those illustrated in the drawings and described in the specification are intended to be encompassed by the present invention.

The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

ADVANTAGES AND RAMIFICATIONS

Non-limiting exemplary embodiment(s) of the present disclosure provide(s) apparatus(es) and methods for the uniform transference of fluid media and any entrained materials or samples to and from different locations possessing different cross-sectional areas with a minimum of band spreading and dispersion. As a non-limiting example, what makes the current invention unique is that it almost completely eliminates end effects and provides simple and expandable apparatuses and methods that may be used with locations as diverse as enclosed channels, surfaces, or even open volumes.

Non-limiting exemplary embodiment(s) of the present disclosure may be centered around a specially designed conduit that provides substantially equal paths from a small portal at one end of the structure to a large portal at the other end. Despite the fact that numerous devices and studies were published throughout the 1980s, 1990s, and early 2000s, no other apparatus or methodology to date essentially eliminates the flow and path irregularities associated with end effects. Often the partial success of prior art came at the expense of dramatically increasing the complexity of the instrumentation or its fabrication. Even the inventors of these alternatives rarely use their own inventions. By providing a simple, easily constructed and disassembled uniform path-length conduit, the present invention furnishes a means that substantially eliminates end effects, significantly improves sample separation resolution, and yet is facilely maintained, adjusted, or replaced. Non-limiting exemplary embodiment(s) of the present disclosure may be effectively incorporated into almost any size system from "lab-on-a-chip" microscale instrumentation to process channels designed for preparative work on a manufacturing scale.

The advantages of non-limiting exemplary embodiment(s) of the present disclosure are significant.

1. The apparatuses and methods substantially eliminate the sample band spreading associated with end effects that traditionally contribute to the loss of sample resolution as fluid medium is transitioned from a smaller or narrower space to one that is larger or wider.

2. Design of the apparatuses and methods may be easily adapted to deliver or collect fluid medium and sample materials to or from a process channel, a surface, or an open volume of any size and used for almost any purpose.

3. When used in association with a process channel, the channel may be employed for a wide variety of applications. Examples include the modification and/or synthesis of chemicals or materials, the separation of mixtures including clinical and environmental samples, and the detection and/or characterization of particles and/or substances.

4. The simplicity of the apparatuses lends themselves to a wide variety of fabrication techniques. Components of the apparatuses may be permanently assembled with appropriate bonding agents or provisionally fastened to facilitate occasional cleaning, repair, or replacement.

5. The apparatuses and/or any associated channel or open volume may be unfilled with any material or the apparatuses and/or any associated channel or open volume may be filled with a gel, or filled with porous, granular, or particulated material.

6. The apparatuses may be segmented to allow sample material to travel along the center of a subsequent channel shielded from the edges of the channel by parallel flowing streams of fluid medium. The shielding minimizes edge effects, another process that can contribute to loss of sample resolution. Upon exiting the channel, the sample particles may be collected separately from the parallel flowing streams to avoid unnecessary dilution of the sample.

7. The apparatuses and methods may be expanded to accommodate multiple conduits, either side-by-side or stacked, permitting multiple inlet and/or outlet connections to a single separation channel. These modifications are particularly valuable in large-scale sample preparative separations and where two-dimensional techniques are employed.

What is claimed as new and what is desired to secure by Letters Patent of the United States is:

1. A method for transferring fluid medium and materials with a minimum of band spreading and dispersion due to non-equal path-lengths between a first location and a second location, each possessing a different cross-sectional area, comprising:

obtaining an apparatus, which said apparatus comprising a conduit of a predetermined shape having a first portal of predetermined size and a second portal of predetermined size, said conduit further having a path formed therein, said predetermined shape of said conduit being such that a length of said path through said conduit from said first portal to anywhere within said second portal is substantially the same, wherein said predetermined size of said first portal is smaller than said predetermined size of said second portal;

performing one of the following steps connecting said second portal in said conduit to or with said second location, and aligning said second portal in said conduit to or with said second location;

obtaining and introducing said fluid medium into said conduit via said first portal until said conduit is filled with said fluid medium;

obtaining and introducing a sample material into said fluid medium via said first portal of said conduit; and obtaining and introducing additional fluid medium at a predetermined flow rate into said conduit via said first portal, wherein said fluid medium travels through said conduit and exits to said second location by way of said second portal of said conduit;

wherein said sample material and said fluid medium are introduced into said first portal of said conduit, each traveling through said conduit and being distributed across said second portal following paths of substantially equal length through said conduit from said first portal to said second portal, thereby substantially eliminating end effects.

2. A method for transferring fluid medium and materials with a minimum of band spreading and dispersion due to non-equal path-lengths between a second location and a first location, each possessing a different cross-sectional area, comprising:

obtaining an apparatus, which said apparatus comprising a conduit of a predetermined shape having a first portal of predetermined size and dimensions and a second portal of predetermined size and dimensions, said conduit further having a path formed therein, said predetermined shape of said conduit being such that a length of said path through said conduit from said first portal to anywhere within said second portal is substantially the same, wherein said predetermined size of said first portal is smaller than said predetermined size of said second portal;

performing one of the following steps connecting said second portal in said conduit to or with said second location, and aligning said second portal in said conduit to or with said second location;

obtaining and introducing said fluid medium into said conduit via said second portal until said conduit is filled with said fluid medium;

collecting any additional fluid medium and any entrained materials entering by way of said second portal of said conduit, wherein said fluid medium travels through said conduit and exits by way of said first portal of said conduit; and wherein said entrained materials and said additional fluid medium are collected from across said second portal and each, traveling through said conduit to said first portal, following paths of substantially equal length through said conduit, thereby substantially eliminating end effects.

* * * * *